United States Patent [19]

Gifford

[11] Patent Number: 5,418,970
[45] Date of Patent: May 23, 1995

[54] PARALLEL PROCESSING SYSTEM WITH PROCESSOR ARRAY WITH PROCESSING ELEMENTS ADDRESSING ASSOCIATED MEMORIES USING HOST SUPPLIED ADDRESS VALUE AND BASE REGISTER CONTENT

[75] Inventor: David K. Gifford, Cambridge, Mass.

[73] Assignee: Massachusetts Institute of Technology, Cambridge, Mass.

[21] Appl. No.: 485,849

[22] Filed: Feb. 22, 1990

Related U.S. Application Data

[63] Continuation of Ser. No. 943,313, Dec. 17, 1986, abandoned.

[51] Int. Cl.⁶ .............................................. G06F 15/16
[52] U.S. Cl. ...................... 395/800; 395/425; 364/DIG. 1; 364/231.1
[58] Field of Search ............... 395/800, 425, 325, 500, 395/428, 400

[56] References Cited

U.S. PATENT DOCUMENTS

| | | | |
|---|---|---|---|
| 4,220,990 | 9/1980 | Alles | 395/550 |
| 4,400,768 | 8/1983 | Tomlinson | 395/800 |
| 4,449,182 | 5/1984 | Rubinson et al. | 395/250 |
| 4,602,328 | 7/1986 | Finger et al. | 395/400 |
| 4,773,038 | 9/1988 | Hillis et al. | 395/500 |
| 4,827,403 | 5/1989 | Steele, Jr. et al. | 395/800 |
| 5,070,446 | 12/1991 | Salem | 395/500 |
| 5,129,077 | 7/1992 | Hillis | 395/500 |

OTHER PUBLICATIONS

"Programming the ILLIAC IV" Report, Department of Computer Science, Carnegie–Mellon University, Nov., 1975, p. 24, by Stevenson.

"Time and Parallel Processor Bounds for Linear Recurrence System" I.E.E.E. Transaction on Computer, vol. (24, No. 7, Jul., 1975, pp. 701–717) p. 714 by Chen et al.

"A Language For Array And Vector Processor" vol. 1, No. 2, Oct., 1979, pp. 177–195, by R. H. Perrott.

"The Illiac IV System" I.E.E.E., vol. 60, No. 4, Apr., 1972, by Bouknight, et al.

"PM4–A reconfigurable multiprocessor system for pattern recognition and image processing" National Computer Conference 1979, p. 258, by Briggs et al.

"Introduction to Data Level Parallelism" Thinking Machine Technical Report 86.14, Apr., 1986, p. 52, by Thinking Machines Corporation.

Primary Examiner—Alyssa H. Bowler
Assistant Examiner—L. Donaghue
Attorney, Agent, or Firm—Fish & Richardson

[57] ABSTRACT

A highly-parallel processing system in which a number of processing elements are interconnected by a network, and are also connected to a system bus and controlled by a central processing unit. Each processing element includes a memory, and all of the memories in the processing elements form at least part of the memory available to the CPU. The processing elements normally execute programs in MIMD mode, and the CPU or another unit can interrupt them to execute a SIMD instruction. The network allows for transmission of variable length messages and also for combining messages when received at a common processing element.

7 Claims, 14 Drawing Sheets

PARALLEL PROCESSING SYSTEM WITH PROCESSOR ARRAY WITH PROCESSING ELEMENTS ADDRESSING ASSOCIATED MEMORIES USING HOST SUPPLIED ADDRESS VALUE AND BASE REGISTER CONTENT

CROSS-REFERENCE

This is a continuation of application Ser. No. 06/943,313 filed on Dec. 17, 1986, now abandoned.

Attached hereto is an unpublished paper by the inventor, David K. Gifford, entitled Processor Lattices For Low-Cost High-Performance Parallel Computation, dated Dec. 1, 1986, which is incorporated hererin by reference.

BACKGROUND OF THE INVENTION

1. Field of the Invention

The invention relates generally to the field of digital data processing systems, and more particularly to parallel processing systems which incorporate a large number of processors that are interconnected in a regular connection structure and in which all of the processors receive the same instruction from a common control structure.

2. Description of the Prior Art

A digital data processing system comprises three basic elements, namely, a memory element, an input/output element and a processor element. The memory element stores information in addressable storage locations. This information includes data and instructions for processing the data. The processor element fetches information from the memory element, interprets the information as either an instruction or data, processes the data in accordance with the instructions, and returns the processed data to the memory element. The input/output element, under control of the processor element, also communicates with the memory element to transfer information, including instructions and data to be processed, to the memory, and to obtain processed data from the memory.

Most modern data processing systems are considered "von Neumann" machines, since they are constructed according to a paradigm attributed to John von Neumann. Von Neumann machines are characterized by having a processing element, a global memory which stores all information in the system, and a program counter which identifies the location in the global memory of the instruction being executed. The processing element is executing one instruction at a time, that is, the instruction that is identified by the program counter. When that instruction has been executed, the program counter is advanced to identify the location of the next instruction to be executed. (In most modern systems, the program counter is actually advanced before the processor has finished processing the current instruction).

Von Neumann systems are conceptually uncomplicated to design and program, since they do only one operation at a time, but they are also relatively slow. A number of advancements have been made to the original von Neumann paradigm to permit the various parts of the system, most particularly the various components of the processor, to operate relatively independently and achieve a significant increase in processing speed. The first such advancement was pipelining of the various steps in executing an instruction, including instruction fetch, operation code decode (a typical instruction includes an operation code which identifies the operation to be performed and in most cases one or more operand specifiers which identify the operands, or data, to be used in executing the instruction), operand fetch, execution (that is, performing the operation set forth in the operation code on the fetched operands), and storing of processed data, which are performed relatively independently by separate hardware in the processor. In a pipelined processor, the processor's instruction fetch hardware may be fetching one instruction while other hardware is decoding the operation code of another, fetching the operands of another, executing yet another instruction and storing the processed data of a fifth instruction. Pipelining does not speed up processing of an individual instruction, but since the processor begins processing a second instruction before it has finished processing the first, it does speed up processing a series of instructions.

Pipelining has also been used within several of the circuits comprising the processor, most notably the circuits which perform certain arithmetic operations, to speed processing of a series of calculations. Like pipelining of instruction processing, pipelining arithmetic operations does not speed up an individual calculation, but it does speed up processing of a series of calculations.

A pipelined processor is obviously much more complicated than a non-pipelined processor in a von Neumann system, as it requires not only the various circuits to perform each of the operations (in a simple von Neumann processor, many circuits could be used to perform several operations), but also control circuits to coordinate the activities of the various circuits. However, the speedup of the system can be dramatic.

More recently, some processors have been provided with execution hardware which include multiple functional units each being designed to perform a certain type of mathematical operation. For example, some processors have separate functional units for performing integer arithmetic and floating point arithmetic, since floating point arithmetic requires handling two parts of a floating point number, namely the fraction and the exponent, while numbers in integer arithmetic have only one part. Some processors, for example the CDC 6600 manufactured by Control Data Corporation, included a number of separate hardware functional units each of which performs one or only several types of mathematical operations, including addition, multiplication, division, branch, and logical operations, all of which may be executing at once. This can be helpful in speeding up certain calculations, most particularly those in which several functional units may be used at one time for performing part of the calculation.

In a processor which incorporates pipelining or multiple functional units (or both, since both may be incorporated into a processor), a single instruction stream operates on a single data stream. That is, each instruction operates on data to produce one calculation at a time. Such processors have been termed "SISD" for "single instruction-single data". However, if a program requires a segment of a program to be used to operate on a number of diverse elements of data to produce a number of calculations, the program causes the processor to loop through that segment for each calculation. In some cases, in which the program segment is short or there are only a few data elements, the time required to perform the calculations on the data is not unduly long.

However, for many types of such programs, SISD processors would require a very long time to perform all of the calculations that are required. Accordingly, processors have been developed which incorporate a large number of processing elements, all operating concurrently on the same instruction, with each processing element processing a separate data stream. These processors have been termed "SIMD" processors, for "single instruction-multiple data".

SIMD processors are useful in a number of applications, including image processing, signal processing, artificial intelligence, database operations and computer simulation of a number of things such as electronic circuits and fluid dynamics. In image processing, each processor performs processing on a pixel ("picture element") to enhance the overall image. In signal processing, the processors concurrently perform a number of the calculations required to produce the Fast Fourier Transform of the signal. In artificial intelligence, the processors perform searches on extensive databases representing the stored knowledge of the application. In database operations, the processors perform searches, as in the artificial intelligence applications, and they also perform sorting operations. In computer simulation of, for example, electronic circuits, each processor represents one part of the circuit, and the processor's calculations indicates the response of the part to signals from other parts of the circuit. Similarly, in simulating fluid dynamics, which can be useful in a number of applications such as weather prediction and the design of airplanes, each processor is associated with one point in space, and the calculations performed provide information about various factors such as fluid flow, temperature, pressure, and so forth, occurring at that point in space.

Typical SIMD processors include two primary components, namely an array of processor elements and a routing network over which the processor elements may communicate the results of a calculation to other processor elements for use in future calculations. In addition, SIMD processors include a control processor for controlling the operations of the processor elements and routing network in response to instructions and data from a host computer system.

Another system architecture has been proposed, namely a multiple instruction-multiple data architecture. A MIMD system is similar to SIMD systems in that it has multiple processor, but it differs from them in that each processor is free to operate on a different program from the others. Under some circumstances, it may be desirable to allow a parallel processing array to operate in both a SIMD mode and a MIMD mode. This may be used, for example, in matrix arithmetic to allow the different processing elements to calculate inner products, which calculations will differ depending on the inner products being calculated by the processing element. In H. J. Siegel, et al., PASM: A Partitionable SIMD/MIMD System For Image Processing And Pattern Recognition, IEEE Transactions On Computers, Vol. C-30, No. 12, Dec. 1981 at pages 934-947, a system is described in which the processing array may execute MIMD programs in response to a SIMD instruction from the control processor. The control processor is signalled when all of the processing elements have completed their MIMD operations to allow the control processor to issue a new SIMD instruction.

In prior highly-parallel array processing systems, the processors in the processing array have been interconnected by a communications network which allows them to transmit data, in the form of messages, among themselves. A number of interconnection patterns, or network topologies, have been used, and others have been proposed. For example, in the MPP by the Goodyear Aerospace Corporation, the processing elements are interconnected in a mesh pattern of a plurality of rows and columns. Each of the processing elements may transmit data only to their four nearest neighbors in the mesh pattern. In the connection machine from the Thinking Machines Corporation, the processing elements are interconnected in a hypercube, or Boolean N-cube pattern to twelve other processing elements. If a message is destined for a processing element to which the transmitting element is not connected, it is transmitted to a processing element which acts as an intermediary, passing it toward the intended recipient. The message may pass through a number of processing elements before it reaches the intended recipient.

SUMMARY OF THE INVENTION

A parallel processing system having a host and a processor array having a large number of processing elements under control of the host. The processing elements each have memory with a plurality of addressable storage locations and a base register. In executing instructions requiring memory accesses, the accesses are performed in response to the addresses in the instruction taken in conjunction with the contents of the base register. Essentially, the contents of the base register defines the base memory location of a block of memory used by the respective processing element, and the addresses in the instruction operate as offsets into that block. If the contents of the base register are changed, the contents of another block in memory may be processed. Accordingly, each block in memory, in combination with the associated processing element, constitutes a separate virtual processing element.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 7 comprising

DETAILED DESCRIPTION OF AN ILLUSTRATIVE EMBODIMENT

General Description

Figure 1:
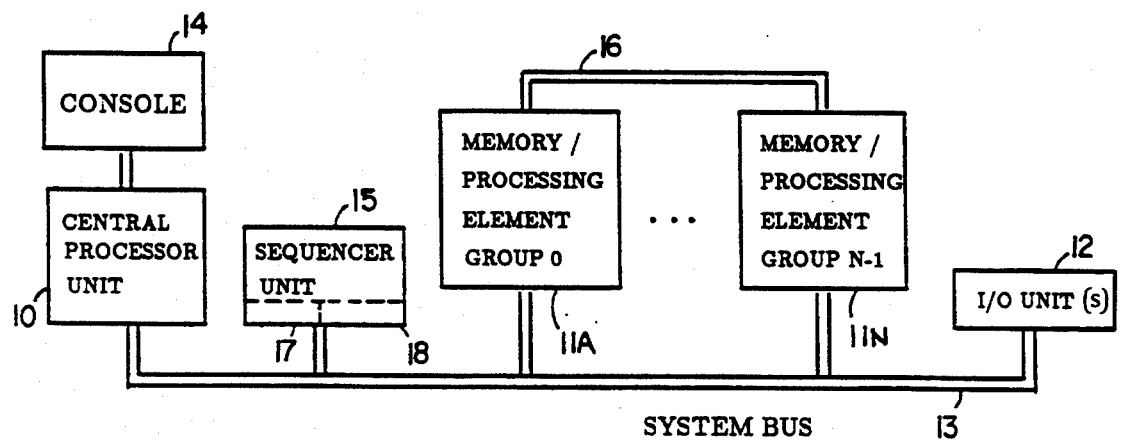
FIG. 1 is a general block diagram of a digital data processing system constructed in accordance with the invention.

Referring to FIG. 1, a data processing system including the invention includes, as basic units, a central processor unit (CPU) 10, a set of memory/processing element groups 11a through 11n (which are generally referred to herein by reference numeral 11) and one or more input/output units 12. A system bus 13 interconnects the CPU 10, memory/processing element groups 11 and input/output units 12 in parallel. A second communications mechanism, namely network 16 interconnects various processing elements (see FIGS. 3A and 3B, below) in the memory/processing element groups 11 as described below to facilitate high-speed, high-volume transfer of information among the various processing elements. The CPU 10, sequencer 15 and input/output units 12 may also be connected to network 16.

The CPU 10 executes instructions that are stored in addressable storage locations in the memory/processing element groups 11. The instructions identify operations that are to be performed on operands, which are also stored in addressable storage locations in the memory/processing element groups 11. The instructions and operands are fetched by the CPU 10 as they are needed, and processed data are returned for storage in the addressable storage locations in the memory/processing element groups 11. The CPU 10 also transmits control information to the input/output units 12, enabling them to perform selected operations, such as transmitting data to or retrieving data from the memory/processing element groups 11. Such data may include instructions or operands which may be transmitted to the memory/processing element groups 11 or processed data which is retrieved from the memory/processing element groups 11 for storage or display.

An operator's console 14 serves as the operator's interface. It allows the operator to examine and deposit data, halt the operation of the CPU 10 or step the CPU 10 through a sequence of instructions and determine the responses of the CPU 10 in response thereto. It also enables an operator to initialize the system through a boot strap procedure, and perform various diagnostic tests on the entire data processing system.

The data processing system may include several types of input/output units 12, including disk and tape secondary storage units, teletypewriters, video display terminals, line printers, telephone and computer network units, and the like. The input/output units 12 operate in response to control information provided by other parts of the system, in particular the CPU 10 or memory/processing element groups 11. The input/output units 12 include control registers (not shown) for storing the control information and status information which store information relating to the status of the particular input/output unit and the operation which has been requested. The control and status registers are all identified by addresses and may be loaded or read in a manner similar to the storage or retrieval of information in or from the storage locations memory/processing element groups 11.

A detailed description of the memory/processing element groups 11 will be presented below in connection with FIGS. 3 through 6. In brief, however, each memory/processing element group 11 includes a plurality of memory elements 43 and a like plurality of associated processing elements 42. Each memory element includes a number of addressable storage locations and constitutes the available memory for its associated processing element, and the conglomeration of the separate memory elements constitutes the memory for the CPU 10. Each storage location is identified by two addresses, namely a system address and an element address. The element address is used by the processing elements to identify the storage locations within the associated memory element. The system address uniquely identifies the location within the system depicted in FIG. 1, and represents the concatenation of a processing element identification code and the element address.

As described below, each processing element may receive instructions from its local memory or from another unit connected to the bus. In particular, each processing element 42 may process instructions which are contained in its local memory 43. Since the instructions may be different for the various processing elements, the collection of processing elements effectively operate in a multiple instruction-multiple data (MIMD) manner. Alternatively, some or all of the processing elements may operate on instructions which originate elsewhere, that is, from the CPU 10, input/output unit 12, or from a processing element. In that case, the collection of processing elements operating on the single instruction effectively operate in a single instruction-multiple data (SIMD) manner.

As noted above, SIMD instructions may be provided by CPU 10, input/output unit 12, or from a processing element 42. In addition, instructions may be provided by a sequencer unit 15 which receives the instructions over bus 13 from the CPU 10 as described below. The sequencer unit 15 includes a buffer 17, which receives and stores the instructions from the CPU 10, and a control circuit 18. The CPU 10, using conventional memory transfer instructions, transmits data representing instructions over bus 13 to the sequencer 15. In response, the control circuit loads the instruction data into the buffer 17. The CPU 10 then issues one instruction to the control circuit which enables it to transmit, at high speed, the contents of the buffer to the processing elements.

Bus 13

Figure 2:
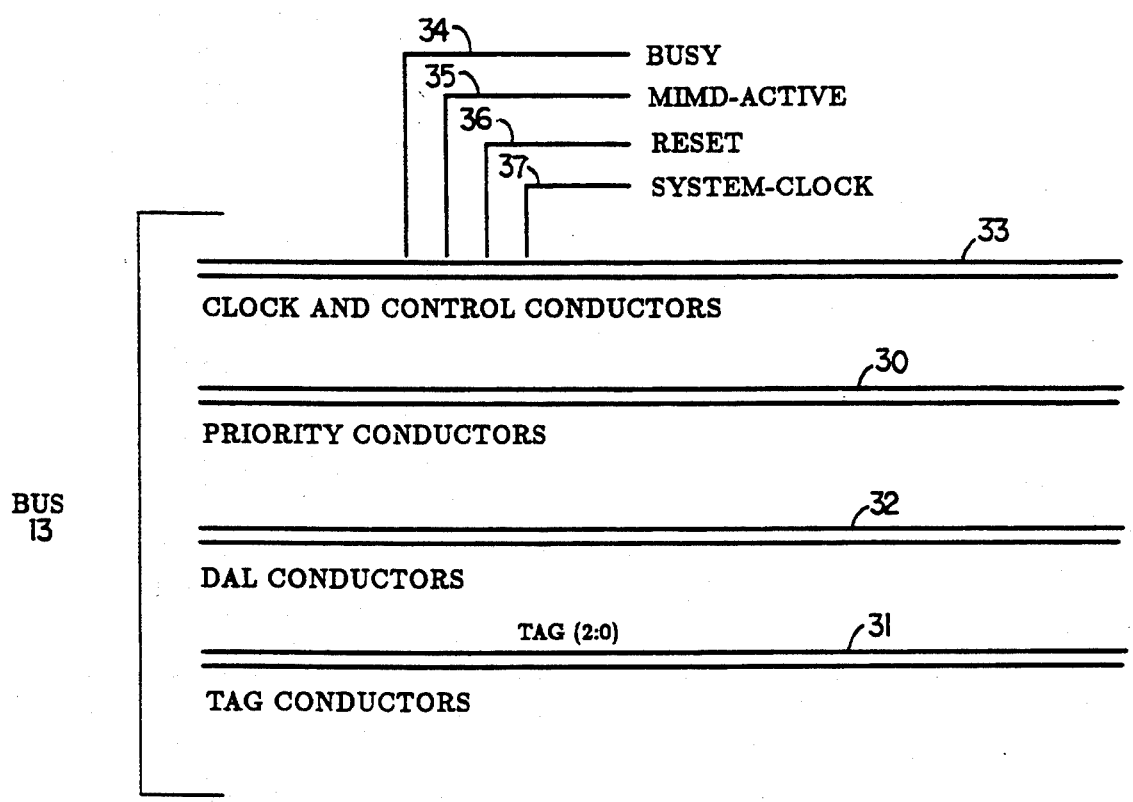
FIG. 2 is a diagram detailing the lines in the input-/output bus in the system depicted in FIG. 1.

Bus 13 interconnects the CPU 10, sequencer unit 15, memory/processing groups 11 and input/output units 12 and allows these various units to transfer instructions and data to other units in the system. In one specific embodiment, which is depicted in FIG. 2, bus 13 is a synchronous, time-division multiplexed bus, that is, information, namely instructions and data, are transferred over it in time slots, or bus cycles, that are defined by a single global synchronizing clock signal. However, it will be appreciated that bus 13 may be asynchronous, in which transfers are timed by means other than a global synchronizing signal.

With reference to FIG. 2, the system bus comprises four sets of lines including priority lines 30, tag lines 31, data/address (DAL) lines 32, and control lines 33. The priority lines 30 are used for bus arbitration purposes. TAG lines carry encoded TAG (2:0) signals that operate as a bus command to identify which of seven types of bus transactions is in progress. The DAL data/address lines 32 lines carry information that is specific to the type of bus transaction. The control lines 33 include lines for carrying a plurality of control signals, including a line 34 for carrying a BUSY signal, a line 35 for carrying an MIMD-ACTIVE signal, a line 36 for carrying a RESET signal, and a line 37 for carrying a SYSTEM-CLOCK signal. The SYSTEM-CLOCK signal provides the global synchronizing signal for bus 13. The SYSTEM-CLOCK signal, in a conventional manner, defines iterative, sequential bus cycles during which operations occur over the bus. The RESET conductor is used to condition all of the units in the system to a predetermined state.

Any of the units depicted in FIG. 1 that are attached to the bus 13 may initiate a bus transaction during which data, such as instructions, operands or other information, is transferred over the bus 13, and particularly DAL data/address lines 32. Because more than one component may have to use the bus during the same bus cycle an arbitration mechanism using priority lines 30 is provided to control access to the bus so that only one unit will use the bus during a given cycle. In one embodiment, a conventional distributed arbitration mechanism is used, in which each unit which connects to the bus and which is required to initiate transfers over the DAL data/address lines 32 is assigned a priority level within an ordered hierarchy of relative priorities.

The priority lines 30 also form an ordered hierarchy of relative priorities, and each unit is connected to the line associated with its own priority. In addition, each unit is connected to the lines associated with the higher priorities. If a unit wishes to have access to bus 13, that is, if it wishes to use the DAL data/address lines 32 during a bus cycle, it must, during the preceding bus cycle, energize its priority line and examine the condition of the higher priority lines. If any of the higher-priority lines are also energized during that bus cycle, that unit is inhibited from using the DAL data address lines 32 during the next cycle. Otherwise, the unit may use the DAL data/address lines 32 during the next cycle.

Depending on the type of bus transaction, as described below, a single bus transaction may take one or several bus cycles to complete. If a bus transaction will take multiple bus cycles, during the first bus cycle, that is after the unit determines through an arbitration operation that it can engage in a transaction, it asserts the BUSY signal by energizing line 34 and maintains it asserted until the bus cycle before the completion of the transaction. The asserted BUSY signal disables bus arbitration, thereby inhibiting other units from gaining access to system bus 13. Since the BUSY signal is negated during the bus cycle before the transaction is completed, an arbitration may occur during that cycle, and another transaction may commence immediately on termination of the transaction. If the transaction requires only one bus cycle, the BUSY signal is not asserted.

The TAG signals identify seven types of transactions over bus 13 as described below:

In a read transaction, the unit that won the arbitration and has access to the system bus 13 transmits an address over the DAL data/address lines 32 and encoded TAG (2:0) signals over the TAG lines 31 during the first bus cycle after winning the arbitration. During that bus cycle, each of the other units connected to bus 13 determines whether it contains the storage location identified by the address. The unit which contains the addressed location transmits its contents as data over the DAL data/address lines 32 during a subsequent bus cycle. Until it receives the data, the unit which sent the TAG (2:0) command signals and address maintains the BUSY signal asserted.

In a write transaction, the unit that won the arbitration transmits an address and data to be written during successive bus cycles over the DAL data/address lines 32. During the bus cycle in which it transmits the address, the unit also transmits encoded TAG (2:0) command signals identifying the transaction as a write transaction. During that bus cycle, all of the other units determine whether they contain the addressed location. The unit which contains the addressed location receives the write data and stores it in the location identified by the address. During the transaction, the unit which transmits the address and TAG (2:0) command signals also asserts the BUSY signal.

A broadcast write transaction is similar to a write transaction, except that the address transmitted over DAL data/address lines 32 is the element address. The processing elements intercept the write data and store it in the location in their associated memory elements identified by the element address.

A guarded broadcast write transaction is similar to a broadcast write transaction, except that only selected processing elements perform the storage operation. The selection of the processing elements to perform the storage operation is based on the condition of an ENABLED flag 55, which is described below in connection with FIG. 4.

During an instruction transaction, the CPU 10, sequencer 15, input/output units 12 or a processing element 42 transmits a SIMD instruction to be executed by the processing elements in the memory/processing element groups 11. After winning the arbitration, the unit originating the transaction transmits encoded TAG (2:0) signals over system bus 13 which identify the transaction as an instruction transaction, and the instruction over the DAL data/address lines 32. The processing elements receive the instruction in parallel and execute it. In response to the instruction, one or more of the processing elements may be required to return results in the form of processed data over the DAL data/address lines 32. If more than one processing element returns a result, all of them transmit the results at once over the DAL data/address lines 32. The results are effectively OR'ed together. The unit transmitting the instruction and encoded TAG (2:0) signals maintains the BUSY signal asserted until completion of the transaction if more than one bus cycle is required.

During a read instruction transaction, the unit which wins the arbitration transmits an address over the DAL data/address lines 32 and encoded TAG (2:0) command signals which identify the transaction. The data that is returned during a subsequent bus cycle is received by the processing elements in memory/processing element groups 11 and treated by them as an instruction. The processing elements receive the instruction in parallel and execute it. In response to the instruction, one or more of the processing elements may be required to return results in the form of processed data over the DAL data/address lines 32. If more than one processing element returns a result the results are OR'ed together over the DAL data/address lines 32. The unit transmitting the address and encoded TAG (2:0) signals maintains the BUSY signal asserted until completion of the transaction if more than one bus cycle is required.

During an interrupt transaction, a unit, other than the CPU 10, which wins the arbitration transmits interrupt information on the DAL data/address lines 32 and encoded TAG (2:0) signals which identify the transaction as an interrupt transaction. Since the transaction requires one bus cycle, the BUSY signal is not asserted. Interrupt service is provided in a conventional manner.

In the illustrative embodiment during a bus transaction that requires a response (such as a read transaction) the BUSY signal is held asserted on line 34 until the response is returned on the bus. It will be appreciated by those skilled in the art that other protocols may be used. For example, a read request may be transmitted as a single bus transaction, and the read data may be transferred by the addressed unit as a second independent bus transaction. In this split protocol the identification of the requesting component is transmitted during the first transaction, and is returned during the second transaction to allow the requesting unit to recognize the corresponding response transaction.

Memory/Processing Element Group 11

Figure 3A:
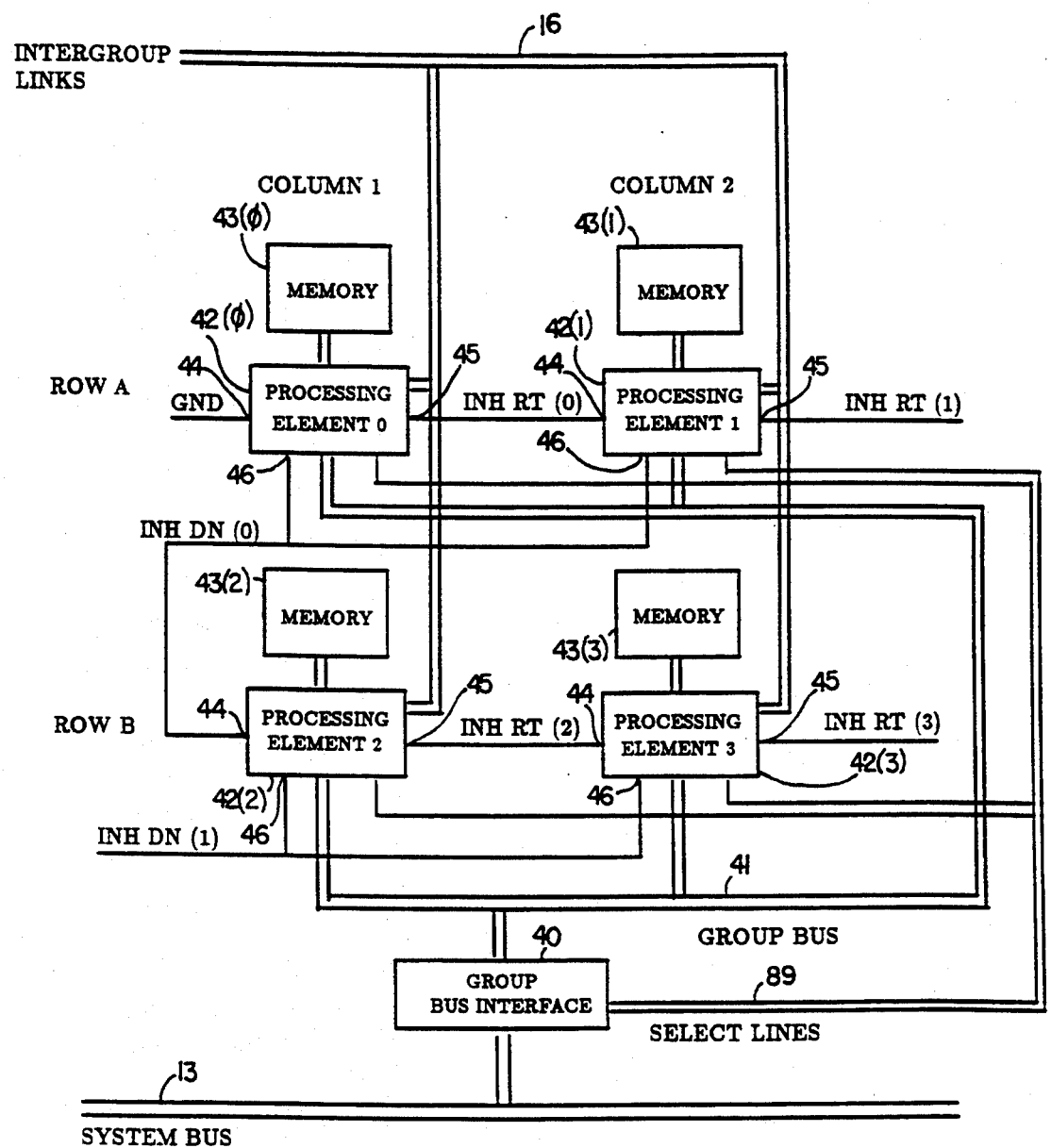
FIGS. 3A, 3B and 3C are general block diagrams of a memory/processing element group in the system depicted in FIG. 1.

FIG. 3A depicts the structure of an illustrative memory/processing element group 11. With reference to FIG. 3A, a memory/processing element group 11 includes a group bus interface 40 that transmits and receives signals over the system bus 13 and also transmits and receives signals over a group bus 41. The group bus 41, the structure of which is described in detail below in connection with FIG. 3C, includes a plurality of signal lines which carry signals which are similar to those carried over the TAG lines 31, DAL data/address lines 32, and control lines 33. Priority arbitration over group bus 41 will be described below.

The group bus interface 40 is normally conditioned to couple the BUSY, RESET, SYSTEM-CLOCK and TAG (2:0) signals from respective lines of the system bus 13, and signals from the DAL data/address lines 32 onto corresponding lines of the group bus 41. In addition, the group bus interface couples a signal from the group bus 41 onto the system bus 13 as a MIMD-ACTIVE signal. However, during certain portions of selected types of transactions over system bus 13, the group bus interface is conditioned to transmit signals onto the DAL data/address lines 32. This occurs, for example, if the transaction is a read transaction. In addition, the group bus interface is conditioned to couple TAG(2:0) signals and signals over the DAL data/address lines 32 during a transaction initiated by a processing element 42 connected thereto.

When a processing element 42 wishes to initiate a transaction, it asserts a REQUEST signal and engages in an arbitration operation for group bus 41. The REQUEST signals from all of the processing elements 42 are ORed together and transmitted over a common line 81 (see FIG. 3C) to group bus interface 40. In response to the receipt of the REQUEST signal, group bus interface 40 asserts its line of the priority conductors 30 (FIG. 2) to initiate an arbitration operation on bus 13. Simultaneously, the processing elements 42 in the memory/processing element group 11 engage in an arbitration operation among themselves to determine which has the highest priority among themselves. If the group bus interface 40 wins the arbitration for system bus 13, it transmits an asserted GRANT signal on a line 80 (FIG. 3C) to all of the processing elements 42. The processing element 42 which wins the arbitration within the memory/processing element group 11 then is able to use the group bus 41. The group bus interface 40 couples communications between the group bus 41 and the system bus 13.

FIG. 3A depicts one organization for arbitration withing the memory/processing element group 11. The memory/processing element group 11 depicted in FIG. 3A includes four processing elements 42(0) through 42(3) (generally identified by reference numeral 42) each connected to one of the four memory elements 43(0) through 43(3) (generally identified by reference numeral 43). The processing elements are all connected to the signal lines comprising group bus 41 in parallel.

As depicted in FIG. 3A, the processing elements 42 are arranged in a plurality of rows and columns. In particular, row (1) comprises processing elements 42(0) and 42(1) and row (2) comprises processing elements 42(2) and 42(3) and column (A) comprises processing elements 42(0) and 42(2) and column (B) comprises processing elements 42(1) and 42(3). It will be appreciated that the memory/processing element group 11 may include more rows and columns of processing elements than the two rows and two columns depicted in FIG. 3A.

Arbitration for group bus 41 is positional, with the processing element 42(0) in row (1) and column (A) having the highest priority and the processing element 42(3) in row (2) and column (B) having the lowest priority. If the memory/processing element group 11 has "m" rows and "n" columns, the lowest priority processing element 42 is in row (m) and column (n). Within each row, the processing element to the left [that is, the processing element 42 in column (A)] has the highest priority, with priority decreasing to the processing element to the right most processing element 42 [that is, the processing element in column (B) or column (n) if there are more than two columns] within the row. In addition, within each column, the uppermost processing element 42 [that is, the processing element in row (1)] has the highest priority and the priority decreases to the lowermost processing element 42 [that is, the processing element in row (2), or in row (m) if there are more than two rows] within the column.

Each processing element 42 has three terminals relating to arbitration, namely (a) an arbitration signal input terminal 44 through which it receives an INH inhibit signal, (b) a row arbitration signal output terminal 45 through which it transmits an INH RT inhibit right signal, and (c) a column arbitration signal output terminal 46 through which it transmits an INH DN inhibit down signal. Within each row, the arbitration signal input terminal 44 of a processing element 42 is connected to receive an output signal from the row arbitration signal output terminal 45 of the processing element 42 to its left, as depicted in the Figure. The processing element 42(0) receives a negated INH inhibit signal at its arbitration signal input terminal 44.

The column arbitration signal output terminals 46 of all of the processing elements in a row are connected together in a wired-OR configuration and are connected to the arbitration signal input terminal of the leftmost processing element 42 in the next row. As depicted in FIG. 3A, the INH DN (0) inhibit down signal from the topmost row is coupled to the arbitration signal input terminal 44 of processing element 42(2). An INH DN (1) inhibit down signal is also generated by the bottommost row of processing elements depicted in FIG. 3A, but there is no lower priority row for that signal to be coupled to.

If a processing element 42 is to initiate a transaction, it transmits asserted INH RT inhibit right and INH DN inhibit down signals through its row arbitration signal output terminal 45 and column arbitration signal output terminal 46. If a processing element 42 is not to initiate a transaction, if the INH inhibit signal received through its arbitration signal input terminal 44 is asserted, the processing element 42 transmits asserted INH RT inhibit right and INH DN inhibit down signals. If a processing element receives a negated INH inhibit signal through its arbitration signal input terminal 44, it may access group bus 41, otherwise it is inhibited from doing so.

Thus, if processing element 42(0) is to initiate a transaction over group bus 41, it asserts its INH RT inhibit right and INH DN inhibit down signals. The INH RT inhibit right signal is coupled to the arbitration signal input terminal of processing element 42(1) as an asserted INH inhibit signal, and so it is inhibited from accessing group bus 41. The asserted INH DN signal is coupled to the arbitration signal input terminal 44 of processing element 42(2) as an asserted INH inhibit signal, and so it is inhibited from accessing group bus 41. In addition, since processing element 42(2) receives an asserted INH inhibit signal, it transmits an asserted INH RT inhibit right signal to processing element 42(3). Processing element 42(3) receives the signal as an asserted INH inhibit signal, and so it also is inhibited from accessing group bus 41.

At the end of each bus cycle on system bus 13, the group bus interface 40 determines whether it has won the arbitration. If it did win the arbitration, it transmits an asserted GRANT signal, which is received by all of the processing elements 42 in parallel, and the processing element whose received INH inhibit signal is negated and asserted INH RT inhibit right and INH DN inhibit down signals are asserted may initiate a transaction over the group bus 41. The group bus interface essentially couples the signals which the processing element 42 transmits over group bus 41 onto the system bus 13.

It will be appreciated by those skilled in the art that the arbitration mechanism for group bus 41 depicted in FIG. 3A and described above has aspects which are similar to a daisy-chain signalling mechanism, but the use of the wired-OR INH DN inhibit down signal enables the inhibiting signal to be transmitted to processing elements 42 of lower priority much faster than would be possible in a conventional daisy-chain. In a conventional daisy-chain, the INH DN inhibit down signal which controls the next row would be the INH RT inhibit right signal from the rightmost processing element 42 in a row; that is, the INH DN inhibit down signal would not be the wired-OR from all of the processing elements in the memory/processing element group 11. Thus, the INH inhibit signal, which controls arbitration, would essentially be passed through all of the processing elements; that is, the INH inhibit signal would be passed through all of the processing elements 42 one by one, with a circuit delay occurring in each of the processing elements. Thus, the time for the signal to be passed from the first processing element 42 to the last processing element would be related to the total number of processing elements 42.

On the other hand, in the arrangement depicted in FIG. 3A, the maximum time for the signal to be passed through the memory/processing element group 11 is related to the number of rows plus the number of processing elements in each row. This is time is less than would be required for a conventional daisy-chain, since the maximum delay required to accommodate the daisy-chain signal is related to the number of rows multiplied by the number of processing elements in each row.

Figure 3B:
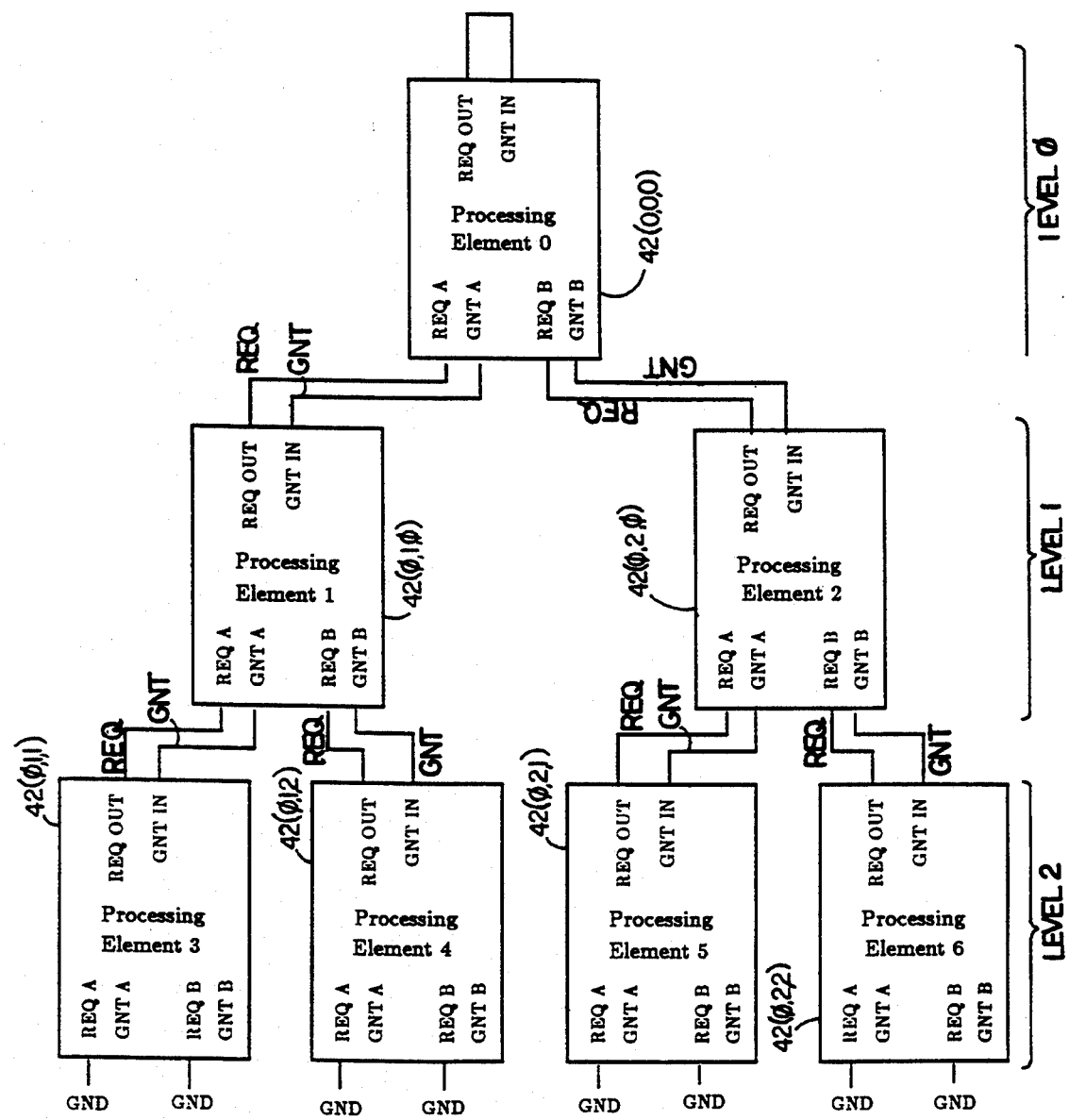

FIG. 3B depicts another arbitration organization for a memory/processing element group 11 which further reduces the time required to perform the arbitration within the memory/processing element group 11. On FIG. 3B, only the interconnections among processing elements 42 for the arbitration operation are shown; the group bus interface 40, group bus 40 and memories 43 are not depicted, nor are the lines for transmitting the REQUEST or GRANT signals.

With reference to FIG. 3B, the processing elements 42 are interconnected in a multi-level tree pattern in which REQ request signals from a plurality of processing elements 42 at each level are coupled to a single processing element at the next level. Three levels are depicted in FIG. 3B, namely levels 0, 1 and 2. Thus, for example, if processing elements 42(0,1,1), 42(0,2,1) and 42(0,1,0) wish to use the system bus 13, processing element 42(0,1,1) in level 2 transmits an asserted REQ request signal to the REQ A terminal on processing element 42(0,1,0), processing element 42(0,1,0) transmits an asserted REQ request signal to the REQ A terminal on processing element 42(0,0,0), and processing element 42(0,2,1) transmits an asserted REQ request signal to the REQ B terminal on processing element 42(0,0,0).

Processing element 42(0,0,0), in response to the receipt of an asserted signal at either its REQ A terminal or its REQ B terminal, or if it wishes access to system bus 13, determines whether it wins the arbitration, and, if not, transmits an asserted GNT grant signal to one of the processing elements in level 1. The processing element 42 receiving the asserted GNT grant signal may also determine whether it wins the arbitration, in which case it blocks the GNT grant signal, or it may transmit an asserted GNT grant signal to a processing element 42 in the next level.

The selection by a processing element 42 at any level whether it blocks a GNT grant signal or transmits it to a processing element 42 in the next level may be fixed, or it may vary. Accordingly, unlike the arbitration mechanism depicted in FIG. 3A, the mechanism depicted in FIG. 3B may facilitate dynamically variable arbitration priorities.

In the arbitration mechanism depicted in FIG. 3B, the maximum delay between a transmission of a REQ request signal by a processing element 42 and its receipt of a GNT grant signal is on the order of the logarithm, to the base two, of the number of processing elements 42. Thus, for large numbers of processing elements 42, the tree arbitration arrangement depicted in FIG. 3B can result in less time being required to perform the arbitration than is required for the array arrangement depicted in FIG. 3A.

Figure 3C:
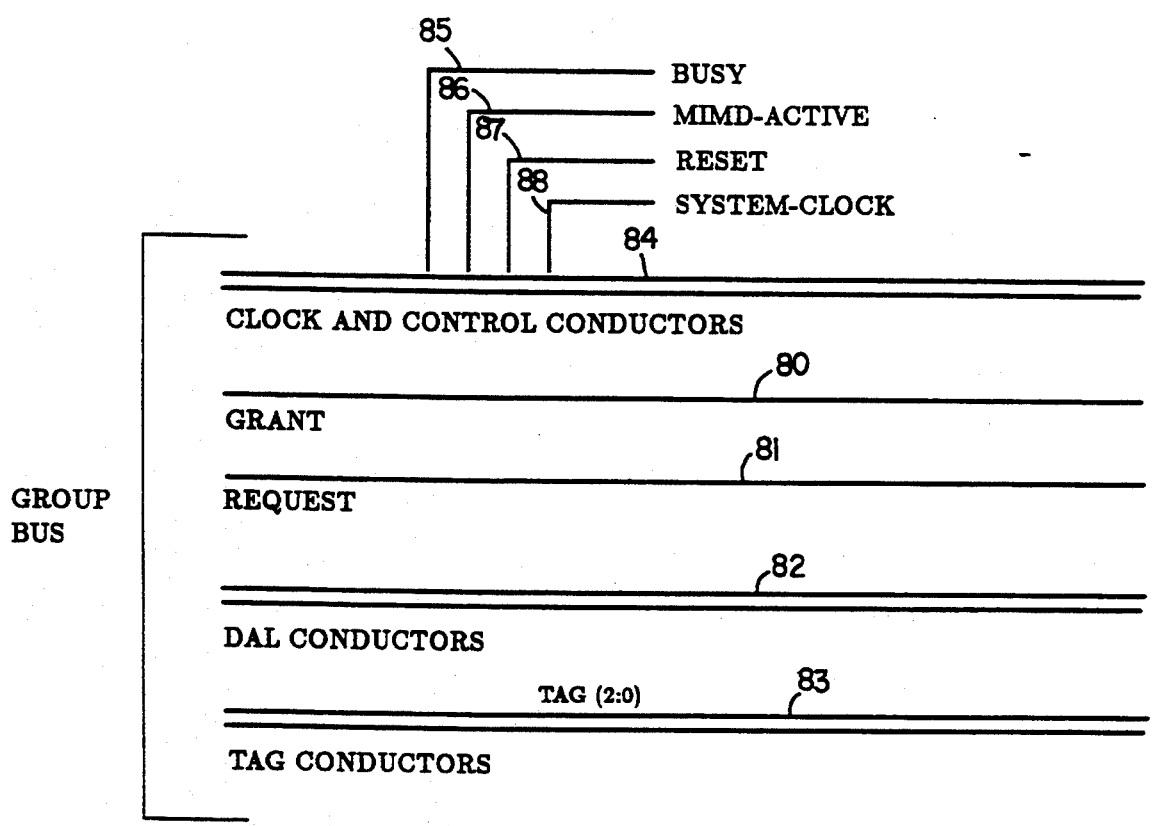

The lines comprising group bus 40 are depicted in detail in FIG. 3C. With reference to FIG. 3C, the group bus 40 includes lines 80 and 81 for carrying the GRANT and REQUEST signals, as well as lines 82 for carrying DAL data/address signals, lines 83 for carrying TAG signals and lines 84 for carrying control signals, including a line 85 for carrying a BUSY signal, a line 86 for carrying an MIMD-ACTIVE signal, a line 87 for carrying a RESET signal and a line 88 for carrying a SYSTEM-CLOCK signal. The signals carried by lines 82 through 88 correspond to the signals carried by lines 31 through 37 (FIG. 2) in system bus 13, and the group bus interface 41 essentially operates as a bus repeater for signals on these line. Alternatively, the group bus interface 41 may partially decode the address signals which it receives from system bus 13 and energize one or more select lines 89 (FIG. 3A) if one processing element 42 is being addressed to enable that processing element 42 to engage in the bus transaction.

It will be appreciated that the processing elements and their associated memories are arranged in groups, and the groups connected to bus 13 through a single group bus interface 40, to avoid undue loading of the bus 13 if large numbers of processing elements are connected into the system. In addition, organizing the processing elements into groups reduces the number of priority conductors 30 that are required in system bus 13, since each group 11 need have only one priority conductor.

Processing Element

Figure 4:
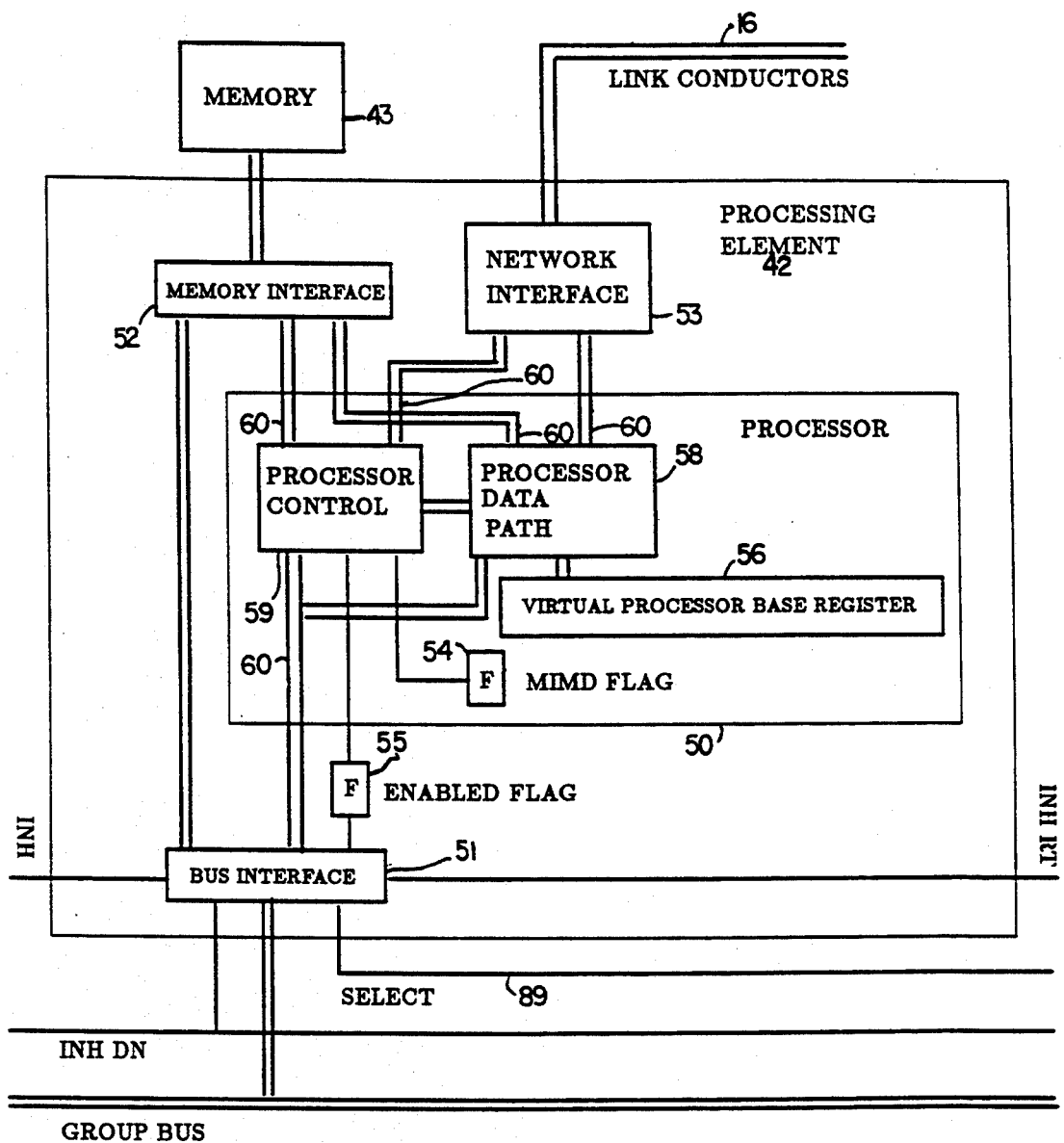
FIG. 4 is a block diagram of a single memory and processing element used in the memory/processing element group depicted in FIG. 3A.

FIG. 4 depicts a block diagram of a processing element 42 constructed in accordance with the invention. A processing element performs five primary functions, namely:

(1) servicing transfers between memory 43 and system bus 13, (2) executing, in synchronism with other processing elements in the system, SIMD instructions, (3) executing MIMD instructions which are stored in their memories 43

(4) generating messages for transfer through network 16 (FIG. 1), and (5) servicing and forwarding messages received from other processing elements through network 16.

The processing element 42 includes a processor 50 that communicates over group bus 41 through a bus interface 51. The processor 50 includes the processing circuits for the processing element 42, that is, it includes conventional data path circuits 58, control circuits 59 and interfaces 60 to the other elements of the processing element 42. The control circuit includes conventional instruction fetch and decode circuits with a program counter which iteratively identifies instructions in the memory 43. The control circuit also includes circuits for identifying operands in memory 53 used in execution of instructions. In communicating with the CPU 10, memory 43, and other processors 50 in other processing elements 42, the processor 50 makes use of a bus interface circuit 51, memory interface circuit 52 and network interface circuit 53, respectively. In its processing as described below, processor 50 makes use of a MIMD flag 54, an ENABLED flag 55 and a virtual processor base register 56. The bus interface 51 is also directly connected to memory interface 52 to accommodate memory requests by another unit for locations in memory 43.

SIMD instructions, which are broadcast to all, or a selected subset, of the processing elements 42 during a broadcast instruction transaction over system bus 13, are transferred through the group bus interface 40 and received by the bus interface 51. The bus interface 51 then interrupts processor 50, which obtains the SIMD instruction from the bus interface 51.

SIMD instructions are divided into two classes, namely, guarded instructions and unguarded instructions. If the processor's ENABLED flag 55 is set and the instruction is a guarded instruction, the processor 50 proceeds to process the SIMD instruction. The processor 50 processes an unguarded instruction regardless of the condition of the ENABLED flag 55. The ENABLED flag 55 also governs whether the processing element 42 will respond to a guarded broadcast write transaction over system bus 13; if an element's ENABLED flag 55 is set, the processing element will respond to the guarded broadcast write transaction, otherwise it will not respond.

Both guarded and unguarded SIMD instructions may be provided to condition the ENABLED flag 55. In particular, it may be desirable to condition the ENABLED flag 55 in response to two conditions tested consecutively. In that case, the first ENABLED flag 55 conditioning instruction would be an unguarded instruction and the second conditioning instruction would be a guarded instruction. As a result of the first instruction, the ENABLED flag 55 in the processing elements 42 which satisfy the first condition would be set, and so they would be the only ones which execute the second instruction. The processing elements 42 which do not satisfy the second condition would reset their ENABLED flags 55, leaving only processing elements 42 which satisfy both conditions, tested consecutively, with their ENABLED flags 55 in the set condition.

If processor 50 is to execute a received SIMD instruction, and the SIMD instruction requires the processor 50 to retrieve data from its memory 43, the processor transmits a memory request to the memory interface 52. The memory request from processor 50 includes a retrieval command and address, the address comprising the sum of the address provided in the SIMD instruction and the contents of the virtual processor base register 56. The memory interface 52 retrieves the contents of the addressed location from the memory 43 and transmits them to the processor 50 for processing.

As described above, the processed data resulting from the SIMD instruction may be transmitted over system bus 13 (FIG. 1) as the second part of an instruction transaction. To accomplish this, the processor 50 transmits the processed data to the bus interface 51, which couples it onto the DAL data/address lines 32 of the group bus 41. The group bus interface 41 (FIG. 3) then couples the signals on the DAL data/address lines 32 of the group bus 41 onto the DAL data/address lines 32 of system bus 13.

The processor 50 may also store the processed data resulting from a SIMD instruction in its memory 43. In that case, the SIMD instruction must contain a storage address, which the processor 50 adds to the contents of the virtual processor base register 56 in the same way as during a retrieval operation from memory 43. The sum of the address from the SIMD instruction and the contents of the virtual processor base register 56 is the address of the location in which the data is to be stored. This address is transmitted along with the data to the memory interface 52. The memory interface 52 then enables the memory 42 to store the processed data in the location identified by the address.

The ENABLED flag 55 may also be set in response to other processing by processor 50, in particular MIMD processing as described below. The virtual processor base register 56 may also be loaded in response to SIMD instructions. The virtual processor base register 56 may be used to divide the address space of memory 43 into blocks, with the contents of the virtual processor base register identifying the first location in a block. An SIMD instruction stream may then be transmitted to process the data in one block, with the addresses in the instruction stream essentially being offsets into the block. That is, the address in memory 43 of the data to be used in processing the SIMD instruction is the sum of the address from the instruction stream and the contents of the virtual processor base register 56.

After a SIMD instruction stream has been processed on data in one block, the contents of the virtual processor base registers 56 in the processing elements 42 may be changed and the same SIMD instruction steam transmitted to enable the processing of data in the block identified by the new contents of the virtual processor base registers 56. The new contents of the virtual processor base registers 56 may be provided directly by the unit transmitting the SIMD instructions, or the processing elements 42 may be provided with a pointer which may be used to obtain from their respective memories 43 the new contents for the virtual processor base registers 56. The virtual processor base registers effectively enable the processing elements 42 to effectively comprise virtual processing elements for each of the separate blocks in memory 43.

Figure 10:
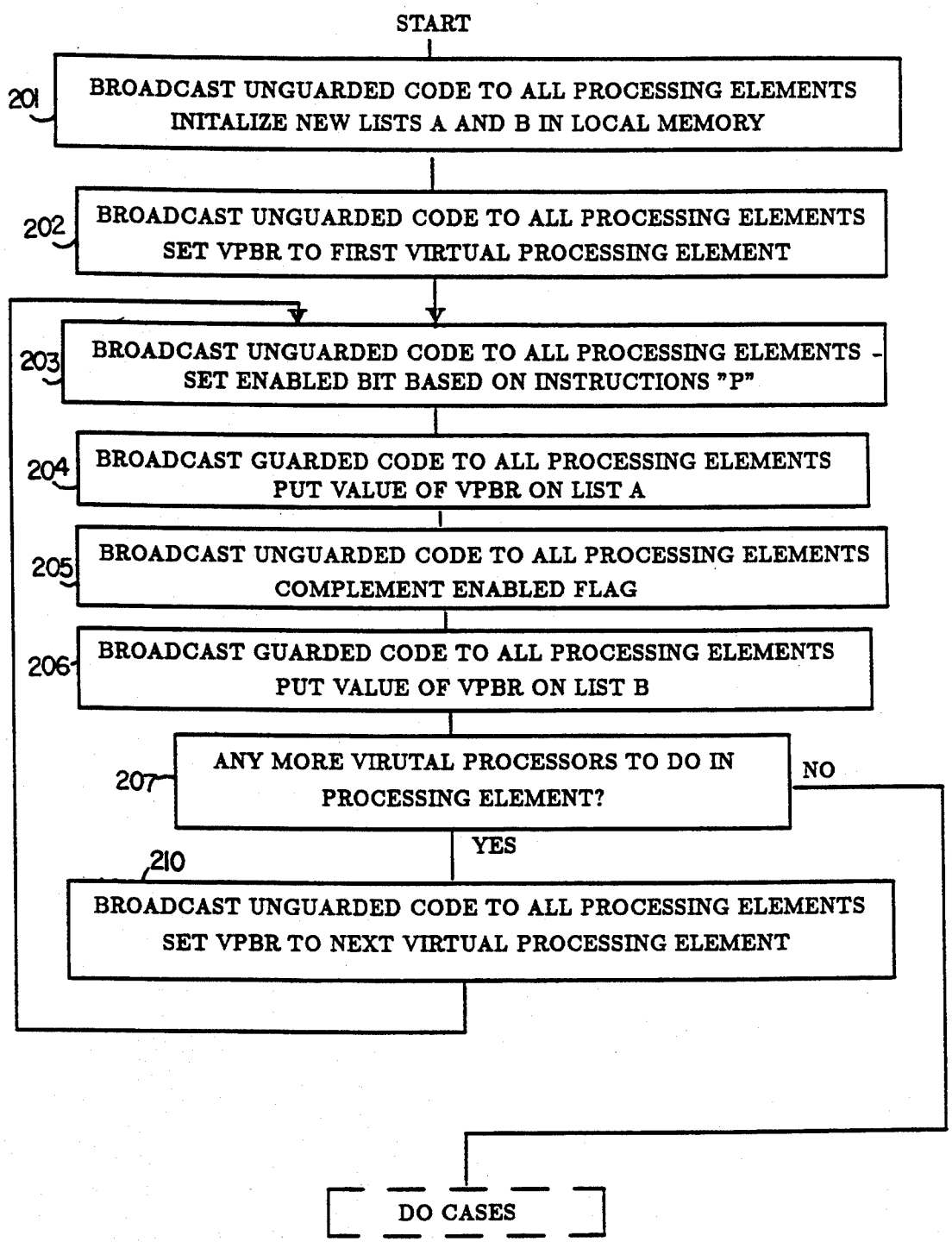
FIGS. 10, 11, 12 are flow diagrams useful in illustrating the operation of the system depicted in FIG. 1.
Figure 11:
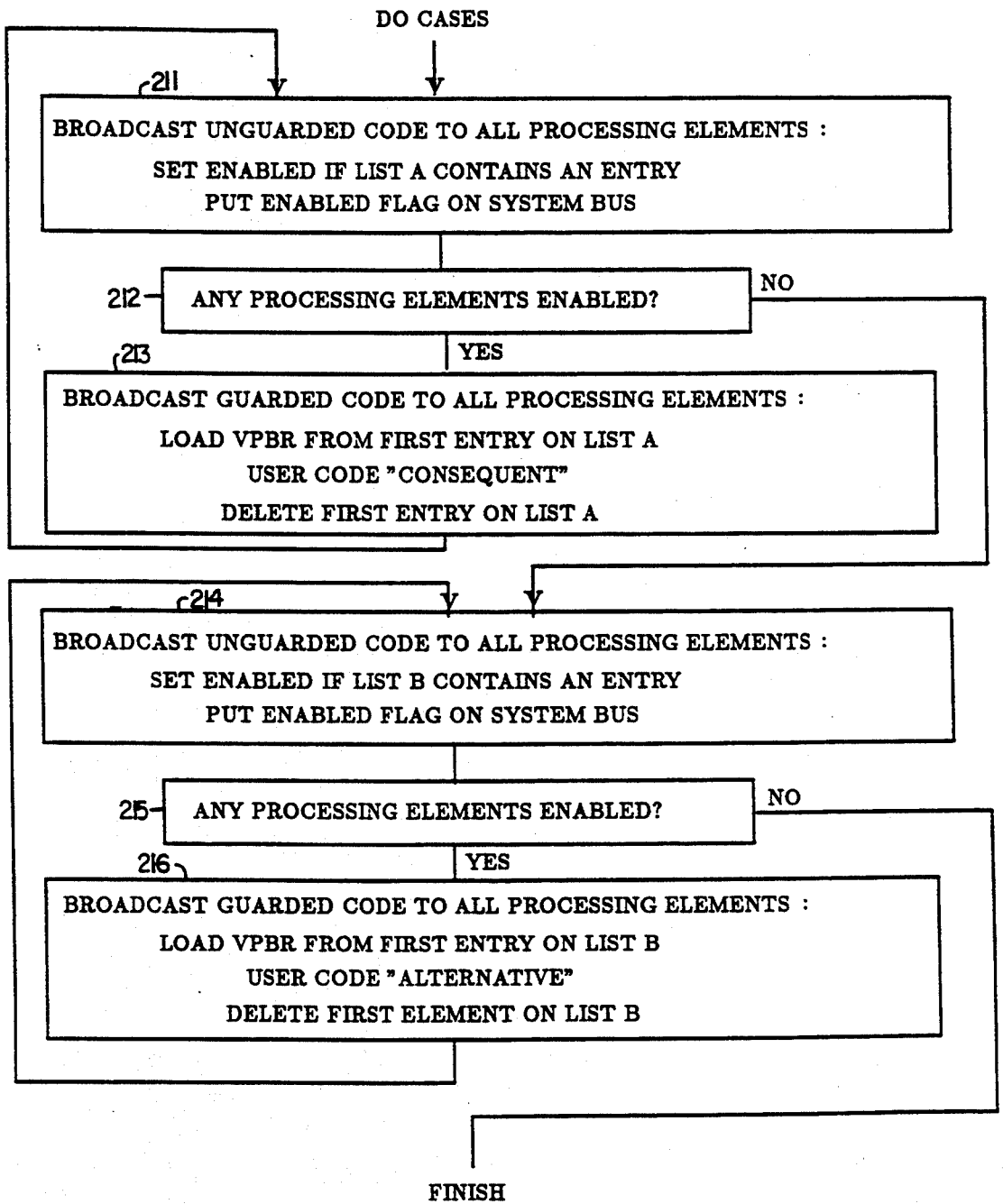

The virtual processor base register 56 provides a facility by which a plurality of virtual processors may essentially be multiplexed onto a single real processing element 42, by providing separate blocks in their respective memories 43 for data to be sequentially processed in response to sequential instruction streams. This permits the system to operate as though it had more processing elements than are physically in the system. FIGS. 10 and 11 depict an example of the operation of this facility in processing the conditional expression "IF P THEN CONSEQUENT, ELSE ALTERNATIVE", in which, if a processing element 42 evaluates an expression "P" to be true, it executes an instruction sequence "CONSEQUENT" and otherwise it executes an instruction sequence "ALTERNATIVE".

With reference to FIG. 10, the unguarded instructions are used to initialize two lists A and B in all of the processing elements (step 201). In all of the processing elements 42, the virtual processor base registers are then simultaneously loaded. Each of the virtual processor base registers 56 point to the region in its respective memory 43 in which the data is stored for the first virtual processing element (step 202). The expression P is then evaluated (step 203), and the ENABLED flags 55 in all of the processing elements 42 are set or cleared in response to the evaluation. That is, in processing elements 42 in which the expression P evaluated to a TRUE condition, the ENABLED flags 55 are set, and otherwise the ENABLED flags 55 are cleared.

After the processing elements evaluate the P expression for one of their virtual processing elements, they store the contents of their respective virtual processor base register in either the A or B list in response to the condition of the processing element's ENABLED flag 55. This effectively marks the virtual processing element as having evaluated the P expression to a true condition, if the contents of the virtual processor base register are stored in the A list, or to a false condition, if the contents of the virtual processor base register are stored in the B list.

Thus, in step 204, each processing element 42 receives guarded instructions which, if the ENABLED flag 55 is set (indicating that the virtual processing element evaluated the P expression to be true), enables it to push the contents of the virtual processor base register onto list A. In response to an unguarded instruction, which is executed regardless of the condition of the ENABLED flag 55, the processing element 42 complements the condition of the ENABLED flag 55 (step 205). If, after complementing, the ENABLED flag 55 is then set, the virtual processing element evaluated the P expression to be false. In response to subsequent guarded instructions, if the ENABLED flag 55 is set, the virtual processing element pushes the contents of the virtual processor base register onto list B, the data list which is processed if the P expression evaluated to be false (step 206).

A determination is then made whether there are any additional virtual processors in any processing element (step 207) to evaluate the P expression. This determination may be made in response to broadcast instruction operation over system bus 13 in which the processing elements 42 respond over the system bus 13, specifically over the DAL data/address lines 32, with a status word indicating whether all of the virtual processing elements have been processed. The responses of all of the processing elements 42 are ORed onto system bus 13. If the status word indicates that there are additional virtual processing elements, unguarded instructions are broadcast to all of the processing elements to enable them to point the contents of the virtual processor base register 56 to the block in their respective memories containing data for the next virtual processing element (step 210). The sequence is then repeated from step 203. Thus, the expression P is iteratively evaluated by all of the processing elements 42 for all of their virtual processing elements.

After the expression P has been evaluated, the sequence depicted on FIG. 11 is performed to execute the CONSEQUENT and ALTERNATIVE code. Initially, unguarded instructions are transmitted to all of the processing elements 42 that enables each them to determine if their respective lists A are empty. If a processing element's list A is not empty, at least one of the virtual processing elements processed by the processing element 42 evaluated the P expression to be true. If a processing element's data list A includes an entry, that is, if it is not empty, it sets the ENABLED flag 55 and energizes a line in the DAL data/address lines 32 of system bus 13 (step 211). If any of the processing elements 42 are enabled, as indicated by the condition of the DAL data/address lines 32 (step 212), a series of guarded instructions is broadcast to (a) transfer the contents of the first entry in the list A to the virtual processor base register 56, (b) process the CONSEQUENT code, and (c) delete the first entry (step 213). Following step 213, the system returns to step 211.

In step 213, the first entry in list A represents the contents of the virtual address base register identifying a virtual processing element which evaluated the P expression to be true. Thus, the CONSEQUENT code is processed in connection with the virtual processing elements which evaluated the P expression to be true. This is repeated until all of the virtual processing elements which evaluated the P expression to be true have executed the CONSEQUENT code.

When all of the virtual processing elements which evaluated the P expression to be true have executed the CONSEQUENT code, in step 211 all of the ENABLED flags 55 will be clear indicating that none of the processing elements 42 have entries in their A lists. Following step 212, the system sequences to steps 214 through 216 to process the ALTERNATIVE code in connection with the virtual processing elements identified in the B lists. Steps 214 through 216 essentially correspond to steps 211 through 213. When the last entry in a list B in a virtual processing element has been processed, all of the ENABLED flags 55 will be cleared, indicating that the system has finished.

It will be appreciated that by having the processing elements 42 first evaluate the P expression for all of the virtual processing elements, load the identifications of the processing elements which evaluate the P expression to be true and false into separate lists, and evaluating only the virtual processing elements in the separate lists can result in a significant reduction in time over other mechanisms of processing the IF P THEN CONSEQUENT, ELSE ALTERNATIVE code. In prior mechanisms, each time the P expression is evaluated, the CONSEQUENT and ALTERNATIVE code is provided, whether or not there are any virtual processing elements to process the code. In the mechanism depicted in FIGS. 10 and 11, the CONSEQUENT and ALTERNATIVE code is provided only if there is a virtual processing element which requires it.

Returning to FIG. 4, the bus interface 51 also communicates with the memory 43 through the memory interface 52 to retrieve data requested in a read transaction, or to store data received in a write or write broadcast instruction. When both the processor 50 and the bus interface 51 attempt to communicate with memory 43 at the same time, the memory interface 52 allows the communication from the bus interface 51 to proceed.

In addition, in response to receiving read or write requests, including read instruction or broadcast write transactions, within selected ranges of addresses in memory 43, the bus interface 51 may transfer the requests directly to the processor 50 rather than memory interface 52. In those cases, the address is passed to processor data path 58 and processor control 59 enables the data path to perform a programmed set of instructions. This facility allows the processor 50 to take an active part in execution of certain memory requests, which can simplify certain types of external communication with processor 50.

The processor 50 may set the MIMD flag 54 in response to a SIMD instruction. When the MIMD flag 54 is set, the processor 50 retrieves MIMD instructions from its associated memory 43 unless it is interrupted by the bus interface 51 in response to the receipt of a SIMD instruction. Each processor 50 includes a program counter which it uses in a conventional manner to identify MIMD instructions which it is processing. While the processor 50 is not executing a SIMD instruction, if the MIMD flag 54 is set it processes a MIMD program. After the processor 50 has finished processing a MIMD program, the processor resets the MIMD flag 54 in response to a final MIMD instruction.

Processor 50 can also set the MIMD flag 54 in response to an interrupt request. For example, an interrupt request is generated by network interface 53 when data has arrived for the processor 50 over network 16, as described below. In response to the interrupt request, the processor 50, when it begins processing the interrupt request, stores the contents of its program counter in a fixed location, sets the MIMD flag 54, and loads a predetermined value into its program counter. The processor 50 then begin servicing the interrupt request. This permits the processor 50 to be notified of, and service, changes in condition of the processing element, such as the arrival of data for it over network 16, without requiring polling of the various circuits comprising the processing element at predetermined intervals.

While a processor's MIMD flag 54 is set, it enables the bus interface 51 to assert a MIMD-ACTIVE signal on the line of group bus 41 which corresponds to line 35 (FIG. 2) of the system bus 13. The group bus interface 40 (FIG. 3) then couples the asserted MIMD-ACTIVE signal onto the system bus 13. If the MIMD-ACTIVE signal on system bus 13 is negated, all of the processors 50 in the processing elements 42 are free to execute new MIMD programs when enabled by the CPU 10.

It will be appreciated by those skilled in the art that the SIMD/MIMD instruction processing facility provided by the processing element 42 can be extremely useful. In particular, the MIMD processing facility essentially permits all of the processing elements 42 to operate independently on programs provided by CPU 10 essentially as a multiprocessing system. Allowing the CPU 10 to transmit SIMD instructions to the processing elements 42 and to interrupt the processors 50 while they are processing the MIMD programs allows the CPU 10 to have executed the SIMD instructions quickly, without having to wait for the processing elements 42 to finish executing the MIMD programs.

Providing the MIMD-ACTIVE signal in the system bus 13 also allows the CPU 10 to synchronize the SIMD/MIMD operation in certain types of programs. For example, in some programs, such as in matrix multiplication, or other matrix manipulation programs, it is desirable for the programs to be structured so that a series of SIMD instructions essentially each enable each processing element 42 to process a MIMD program to manipulate the matrix data. In addition, in a number of types of operations, some processors 50 will take longer than others to finish because of certain data dependencies. While the MIMD programs are being processed, the MIMD-ACTIVE signal is asserted. After the processing elements 42 have completed the MIMD programs enabled by an SIMD instruction the MIMD-ACTIVE signal is negated, which indicates that the processing elements 42 have finished processing their MIMD tasks, thus indicating when the processed data is ready.

Figure 12:
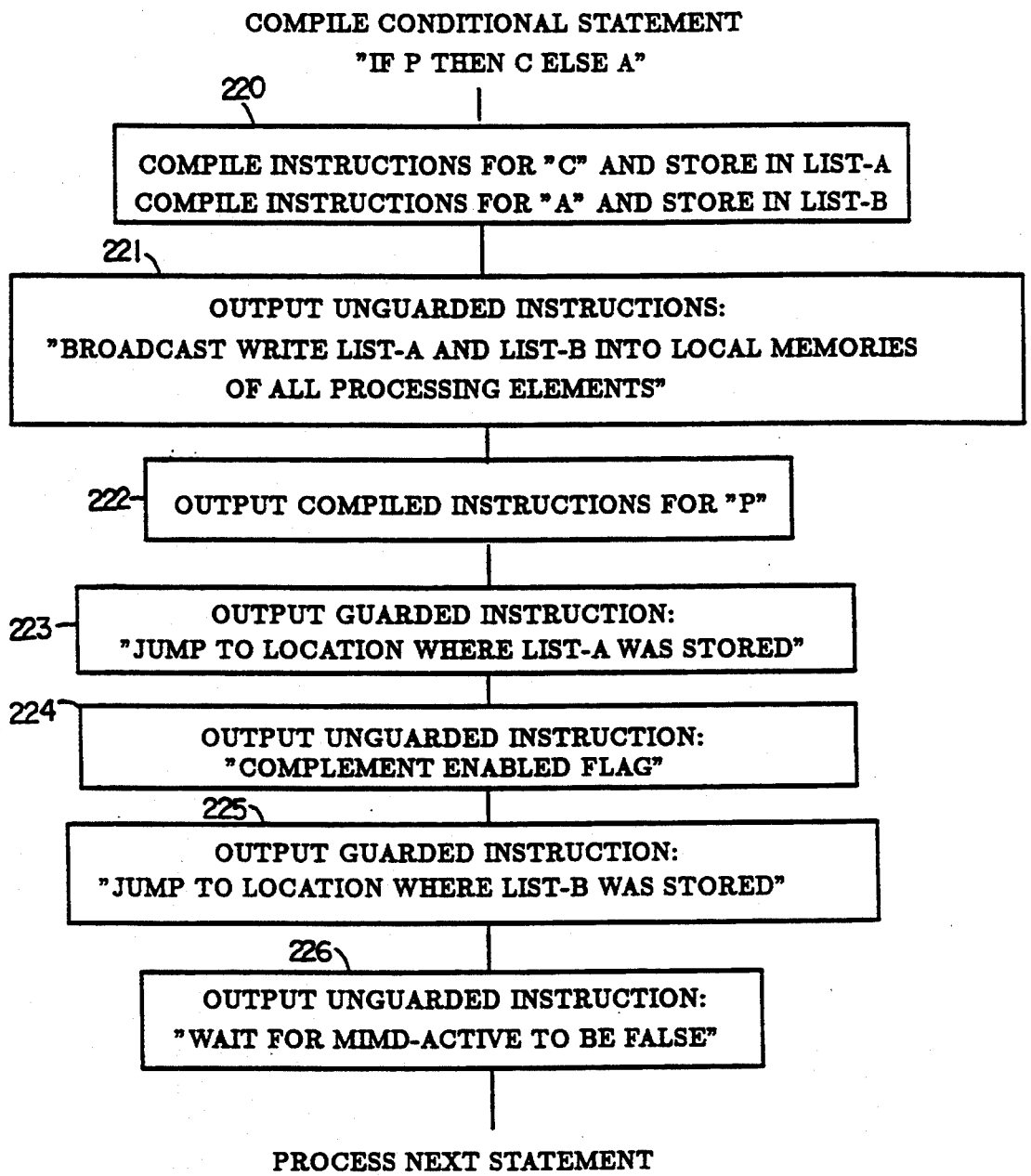

A sequence of operations for use with the conditional statement IF P THEN CONSEQUENT, ELSE ALTERNATIVE depicted in FIGS. 10 and 11 which illustrates the SIMD/MIMD operation will be described in connection with FIG. 12. The code for both the CONSEQUENT and the ALTERNATIVE is stored in each of the processing elements 42, while the code for evaluating the P statement is broadcast to all of the processing elements 42. FIG. 12 depicts a general flow diagram of a compiler for achieving this result.

With reference to FIG. 12, instructions for the CONSEQUENT and ALTERNATIVE are first compiled and stored in LIST-A and LIST-B, respectively (step 220). Thereafter, unguarded instructions are generated to write the LIST-A and LIST-B instructions into the memories 43 of the processing elements 42, using broadcast write operations over system bus 13 (step 221). In step 222, compiled instructions are provided in a SIMD mode to evaluate the P statement, which enables the processing elements 42 to set or clear their respective ENABLED flags 55.

Following step 222, a guarded instruction is provided which enables the processing elements 42 whose ENABLED flags 55 are set to jump to the location where LIST-A, the CONSEQUENT code, is stored (step 223). The processing elements 42 whose ENABLED flags 55 are set may then begin processing the CONSEQUENT code in a MIMD mode. Simultaneously, a SIMD instruction is provided to complement the EN- ABLED flags 55 (step 224). All of the processing elements 42 complement their ENABLED flags 55, including the processing elements 42 which are processing the CONSEQUENT code. Thereafter, guarded instructions are provided enabling the processing elements 42 whose ENABLED flags 55 are set to jump to the location where LIST-B, the ALTERNATIVE code is stored, and begin executing that code in a MIMD mode (step 225). At this point, the MIMD ACTIVE signal is asserted, as the processing elements 42 are processing either the CONSEQUENT code or the ALTERNATIVE code. No further instructions are provided until the MIMD ACTIVE signal is negated (step 226).

An advantage of this compiling technique is that it reduces the amount of time that is required to execute certain conditional statements. Current compiling techniques for such statements normally result in the broadcast of instructions for the CONSEQUENT case, followed by the broadcast on instructions for the ALTERNATIVE case. In that case a given processing element would be idle while instructions for one of the two cases is being broadcast.

Network Interface

As noted above, network 16 provides a mechanism for transferring information, which may include either data or instructions, among processing elements 42. Each processing element 42 has a unique identification code number, which constitutes its address in network 16. The data is transferred in the form of messages which include a destination address field, which includes the network address of the intended receiving processing element 42 and, if appropriate, the virtual processing element. Following the destination address field is the data to be transferred. The length of a message is not limited, but the message is transmitted in one or more blocks whose structures are depicted in FIGS. 7A through 7D.

With reference to FIGS. 7A through 7D, four types of message blocks are transferred through network 16. The first block of a message is a start block 60, depicted in FIG. 7A. The start block 60 begins with a TYPE field 61 which contains a binary encoded signal that indicates that it is a start block, and that other blocks are to follow. Following TYPE field 61, a single-bit COMBINE field 62 is used as described below. Following the COMBINE field 62 is an ADDRESS field 63 for the destination address. The ADDRESS field includes a field 64 which carries the address of the destination processing element and a field 65 which carries the identification of the virtual processor at the destination processing element. Depending on the length of fields 61, 62 and 63, and the block length, there may be room for another field. If any room is left in the start block 60, that constitutes a DATA field 66, in which the first data bits in the message are transmitted.

Figure 7A:
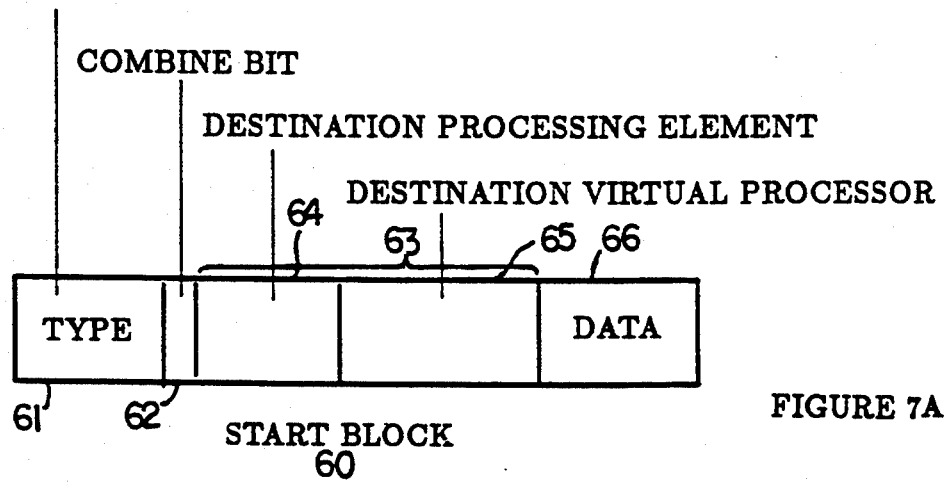
FIGS. 7A, 7B, 7C and 7D depict the structures of messages which are transmitted over the communications network.

If a message is only one block long, that is, if all of the data to be transmitted fits into the DATA field 66, the structure of the block is similar to that depicted in FIG. 7A. The TYPE field 61 contains a corresponding binary encoded signal.

Figure 7B:
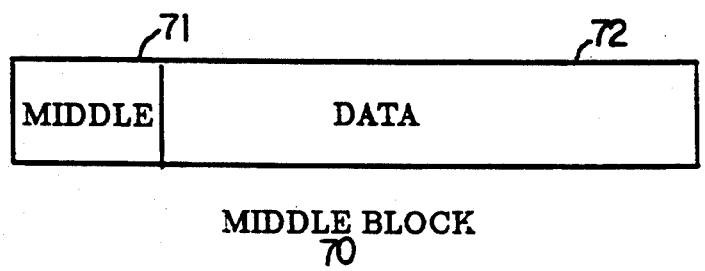

If the message requires more than two blocks, a middle block 70, which is depicted in FIG. 7B, is transmitted after the start block 60. The middle block 70 begins with a TYPE field 71 which contains a binary encoded signal that indicates that it is a middle block, and ends with a DATA field 72 which contains the data.

Figure 7C:
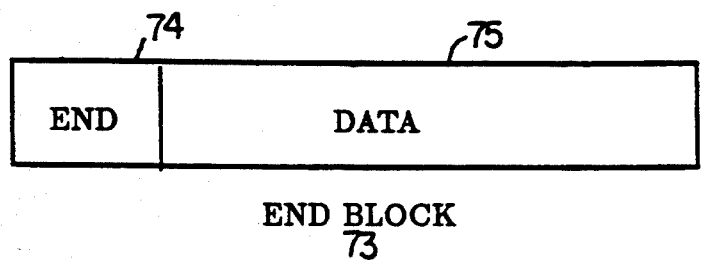
Figure 7D:
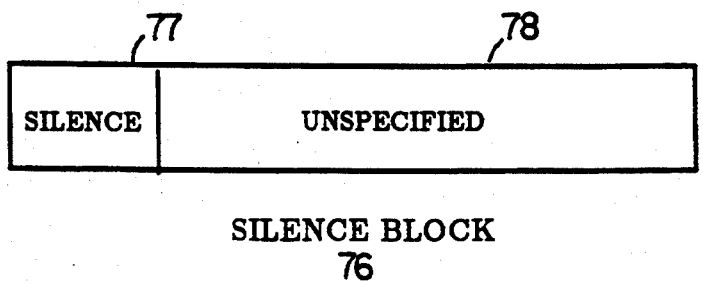

The last block in a message is an end block 73, which is depicted in FIG. 7C. The end block 73 includes a TYPE field 74 which contains a binary encoded signal identifying it as an end block and a DATA field 75 containing the message data.

It will be appreciated that, since a message is defined by a start block and an end block, messages, including messages that are contemporaneously transmitted by processing elements 42, may be of variable length. This is useful particularly during MIMD processing, as MIMD processing by the various processing elements 42 may result in messages of diverse lengths being transferred contemporaneously.

As detailed below, in the network 16 each processing element 42 is not connected to all of the other processing elements. Accordingly, to transmit a message to another processing element, the transmitting processing element may have to transmit the message by way of one or more other processing elements 42, each of which forwards the message until it reaches its destination. Based on the contents of the address field 63 in a start block 60 (FIG. 7A), the network interface 53 at each of the processing elements 42 which receives the start block sets up a logical link between incoming network links and outgoing network links which forward the blocks comprising the message to the next processing element 42. The logical links remain set up until an end block 73 is received. After transferring the end block, the processing element 42 terminates the logical link.

While a logical link is established, if a transmitting processing element 42 is unable to transmit a block but if it has not completed the message, the processing element 42 transmits a silence block 74 to the next processing element 42. The processing element 42 may be delayed because of, for example, the receipt of a SIMD instruction or a memory request from another processing element 42 or the host CPU 10 which delayed its construction of a middle or end block. The silence block 74 includes a TYPE field which contains a binary encoded signal identifying it as a silence block and a field 76 which is not used.

In addition to the fields depicted in FIGS. 7A through 7D, each of the blocks may include a field (not shown) for carrying one or more error correction and-/or detection bits, which may be used to determine whether the message block has been properly transferred over a network link. If it has not, the message block is repeated.

Figure 5:
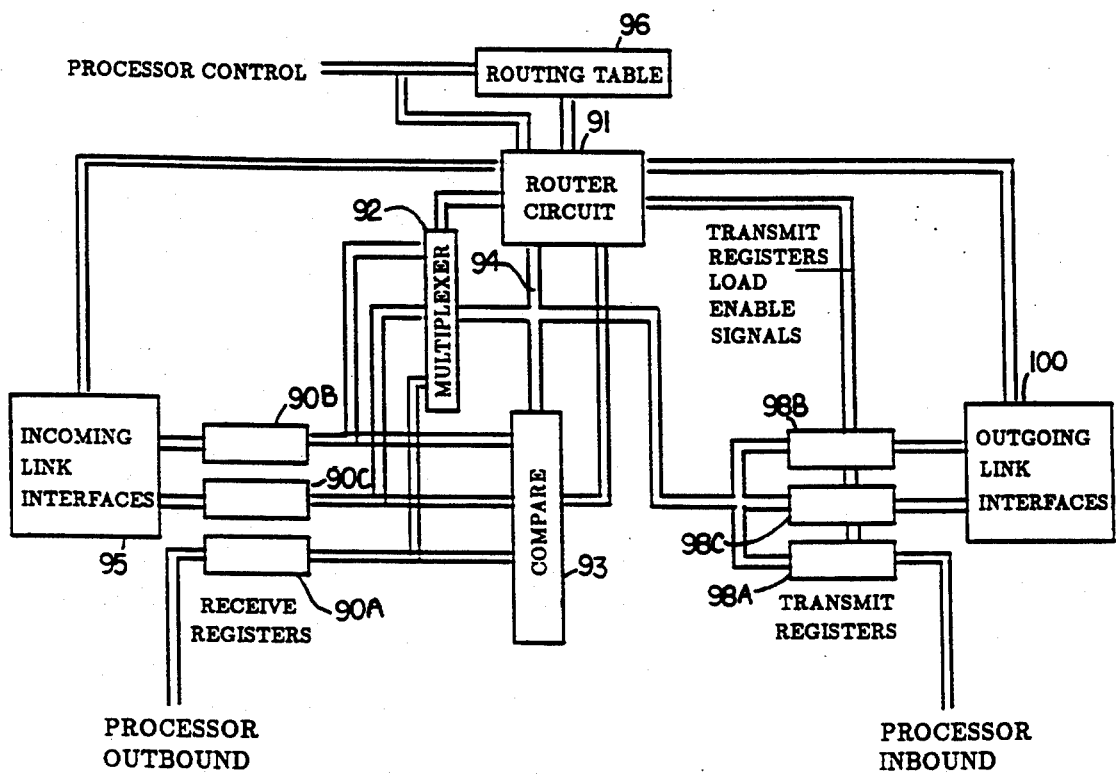
FIGS. 5 and 6 depict an interface to an interprocessing element communications that is in a processing element depicted in FIG. 4.
Figure 6:
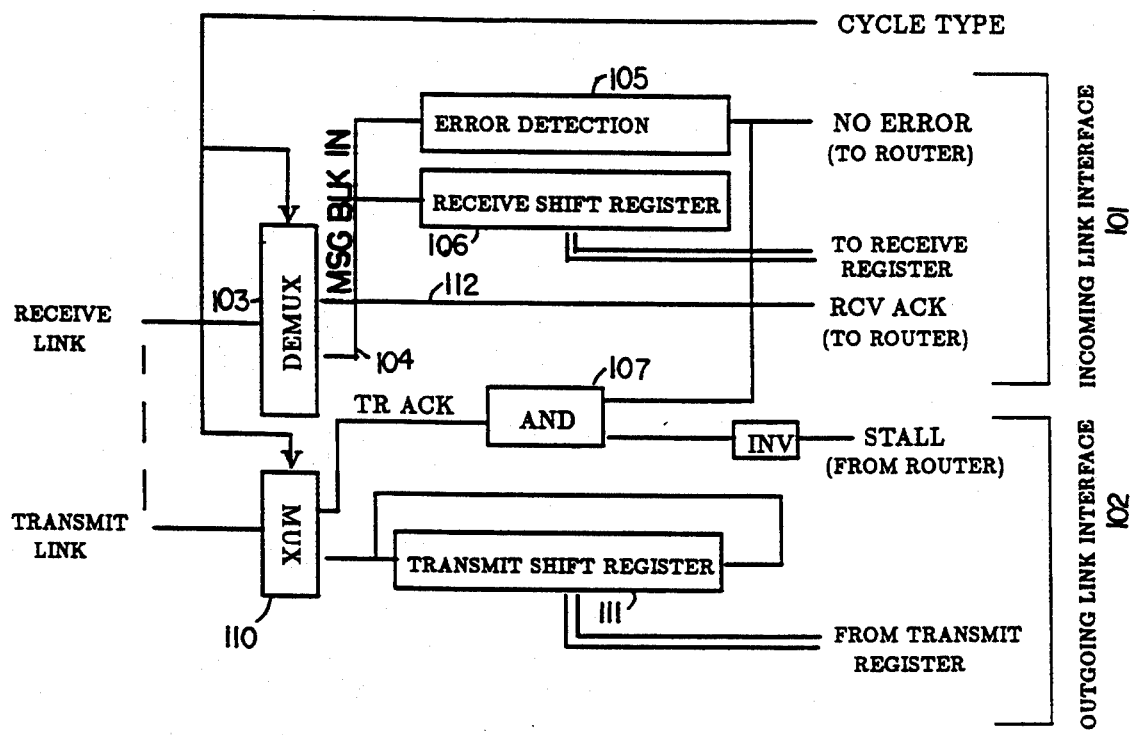
Figure 9:
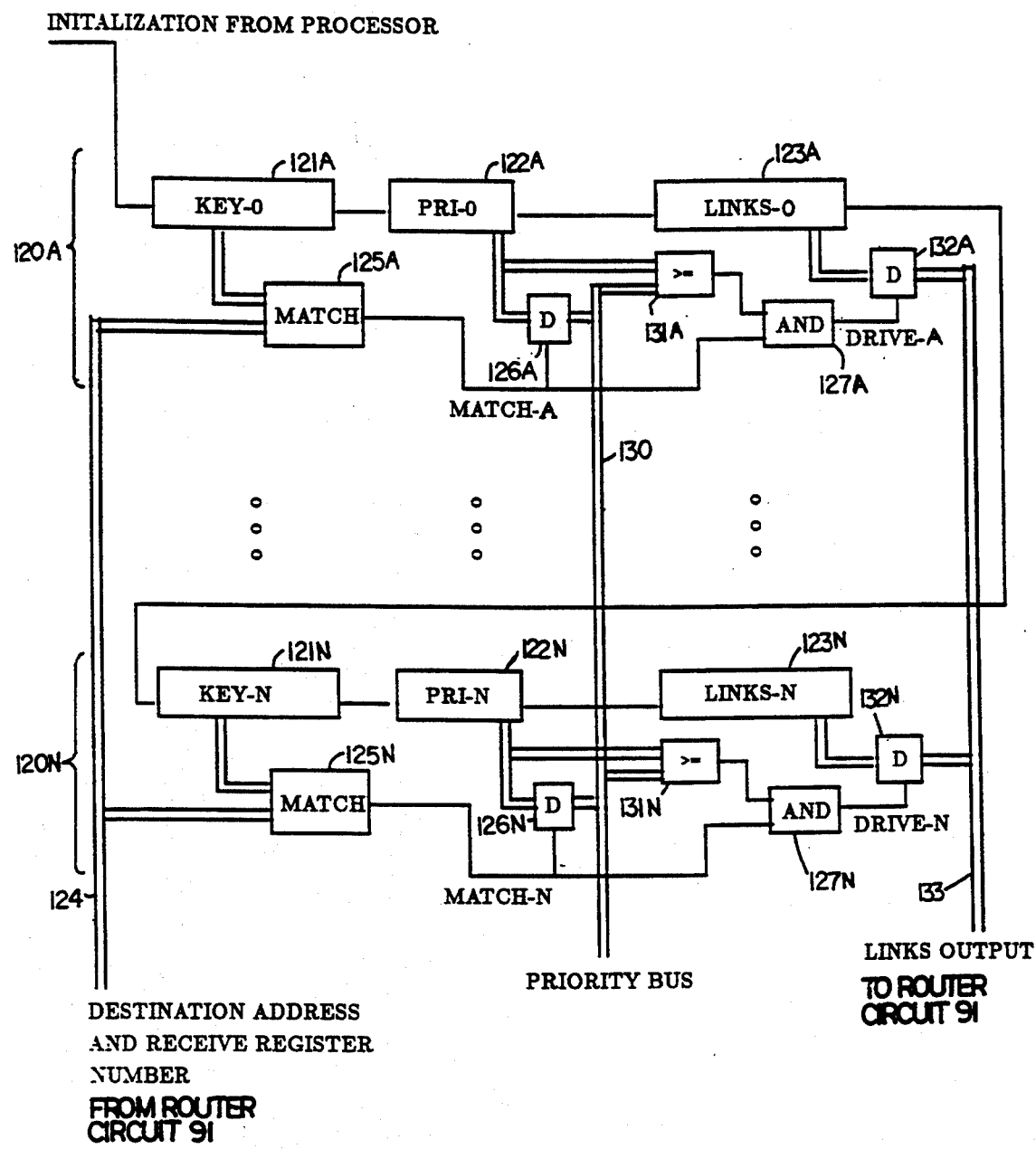
FIG. 9 is a diagram depicting in greater detail a portion of the interface depicted in FIG. 5.

FIGS. 5, 6 and 9 depict functional block diagrams of a network interface 53 constructed in accordance with the invention. The network interface 53 in each processing element 42 is connected to network interfaces in a plurality of other processing elements 42 by means of bidirectional network links. Each network link provide a path for carrying message bits serially from one network interface to another interface 53, and a separate path for carrying message bits serially from the second interface 53 to the first. In addition, each network link includes paths for carrying control signals as described below.

When a message is received at a network interface 53 from another processing element 42, it is initially received in an incoming link interface 95. The network interface 53 includes one incoming link interface 95 for each of the links in the network 16. The incoming link interface 95, which is described in detail in connection with FIG. 6, serially receives the bits comprising a message block, performs error checking on the received block and also, in conjunction with an outgoing link interface 96 of the transmitting processing element 42, performs flow control on the message blocks.

After a block has been correctly received by the incoming link interface, it transfers the block in parallel into a corresponding receive register (two receive registers 90B and 90C are depicted). When the processor 50 of the processing element 42 is to send a message, it transmits the message blocks in parallel to a processor outbound register 90A (the registers 90A, 90B and 90C will be generally identified by reference numeral 90). Each register 90 is large enough to hold an entire message block as described above in connection with FIGS. 7A through 7D.

A router circuit 91 controls a multiplexer 92, which is connected to all of the registers 90, to sequentially couple the contents of the registers 90 onto a parallel bus 94. The router circuit 91 first examines the signals on bus 94 corresponding to the type field to determine the type of block in the register 90. If the block is a start block 60 (FIG. 7A), the router circuit 91 examines the signals corresponding to the destination address field 63 (FIG. 7A), and, in particular, the destination processing element field 64.

Contemporaneously, a comparator 93 receives the signals on the lines of bus 94 corresponding to the destination address field 93, and compares them to the condition of the corresponding portions of the rest of registers 90. If there is a match, and if the COMBINE bit 62 is asserted or set, the comparator circuit 93 transmits the identification of the registers 90 which contain a match to the router circuit 91.

If the comparator 93 has not identified a matching register 90, after receiving the destination address field 63 from bus 94, and if the block is a start block, the router circuit 91 then interrogates a routing table 96. In response to the destination address field 63 and the identification of the particular register 90, the routing table 96 identifies a transmit register 98B or 98C, or a processor inbound register 98A (registers 98A, 98B and 98C are generally identified by reference numeral 98) which is to receive the start block. The processor 50 of the processing element 42 receives message blocks placed in processor inbound register 98A. The router circuit 91 establishes an entry in a correspondence table (not shown) which identifies the register 98 to receive communications from the register 90. The router circuit 91 then generates appropriate transmit register load enable signals which enable the appropriate register 98 to load the signals on bus 94.

If, on the other hand, the comparator 93 does identify a matching register 90, the router circuit places an entry in the correspondence table identifying the processor inbound register 98A as receiving message blocks from (a) the register 90 whose contents are currently being coupled onto bus 94, and (b) the register 90 which contains a matching destination address. The router circuit 91 then generates appropriate load enable signals which enable the processor inbound register 98A to load the signals on bus 94.

When the router circuit, in its scan of registers 90 reaches the register with the matching destination address, it initially stalls that message, and, after the first message is coupled to the processor inbound register 98A, enables the stalled message to be coupled to the processor inbound register 98A. In this way, the processor 50 receives both messages which are destined for the same address if the combine bits are both set. After receiving both messages, the processor 50 may then perform a logical operation on the messages, perhaps, for example, an addition operation, to combine them, and transmit the result to the destination processing element 42, thereby reducing the message traffic through network 16. Since the messages are transmitted to the processor 50, the operations performed on the messages may be any operations or sequence of operations which the processor 50 can perform, which operations may be varied by a programmer.

If, in response to a request from the router circuit 91, the routing table 96 identifies a register 98 which is already indicated in the correspondence table as receiving message blocks from a register 90, that is, if a message requires a register 98 which is already being used for another message, the router circuit may have the message blocks from that register 90 be delivered to the processor inbound register 98, if it is not already also receiving a message. The processor 50 (FIG. 4) then buffers the message for a time, and then re-inserts it into the network 16 by transmitting it through the processor outbound register 90A.

If the processor inbound register 98A is already receiving message blocks, the router circuit asserts a STALL signal, which effectively causes the message to stall. One STALL signal is generated for each of the registers 90. Blocks forming the stalled message are effectively stalled all along the path from the processing element 42 which generates the stalled message.

If the router circuit 91 determines that the signals in the type field on bus 94 identify to a middle block 70 or an end block 73, it identifies from the correspondence table the register 98 to receive the block and, if the previous block has been transferred from the register 98, generates load enable signals enabling the identified register 98 to load the signals on bus 94. If the previous block has not been transferred from the register 98, the router circuit 91 generates the STALL signal for the link interface that corresponds to the register that is then being selected by mulitplexer 92. Following an end block, the router circuit 91 cancels the entry in the correspondence table.

The router circuit sequentially performs the above-described operation on the contents of all of the registers 90, after which all of the registers 90 are normally overwritten by message blocks from the incoming link interfaces. Simultaneously, the contents of the registers 98B and 98C are transferred to outgoing link interfaces 100, which serially couple their contents onto corresponding network links to other processing elements 42. The operation is then repeated. Thus, the router circuit operates on the message blocks contained in all of the registers 90 in the time required to shift a message block from the network links into the incoming link interfaces 95 or out of the outgoing link interfaces onto the corresponding network links.

The processor 50 is connected to the routing table 96, as described below in connection with FIG. 6 and the router circuit 91. Using this connection, the processor 50 can reset the router circuit 91 to a known state, determine if there are any message blocks in the router, and direct the router circuit 91 to establish logical links between specified receive and transmit registers, regardless of the contents of the routing table 96. In addition, the router circuit 91 may use this connection to notify the processor 50 that a message block has been transferred to the processor inbound register 98A.

FIG. 6 depicts a detailed circuit diagram of an incoming link interface 101, which receives message blocks from a processing element 42, and a corresponding outgoing link interface 102, which transmits message blocks to the same processing element 42. Incoming link interface 101 is part of interface 95 (FIG. 5), and outgoing link interface 102 is part of interface 100 (FIG. 5).

With reference to FIG. 6, incoming MSG BLK IN message block in signals are received by a demultiplexer 103. If a CYCLE TYPE signal is negated, indicating a block transport cycle, the demultiplexer 103 couples the MSG BLK IN message block in signals onto a line 104 an input terminal of an error detection circuit 105 and a shift in input terminal of a receive shift register 106.

After all of the signals representing the bits of a message block have been received, the error detection circuit determines whether the message block has been properly received. If it has, a NO ERROR signal is asserted, which enables one input of an AND gate 107 in the outgoing link interface 102. If the STALL signal associated with the register 90 to which the incoming link interface 101 is connected is not asserted, an inverter couples an asserted signal to the other input of AND gate 107. As a result, the AND gate 107 is energized to generate an asserted TRACK transmit acknowledge signal, which is coupled to one input of a multiplexer 110. When the CYCLE TYPE signal is next asserted, indicating an acknowledgement cycle, the multiplexer couples the asserted TRACK transmit acknowledge signal onto the link to the processing element 42 from which the message block was just received.

If, on the other hand, the NO ERROR signal from error detection circuit 105 is negated, indicating an error in the receipt of the message block, or if the STALL signal is asserted, indicating a stall condition, the AND gate 107 is de-energized, thus generating a negated TRACK transmit acknowledgement signal, which is coupled onto the transmit link when the CYCLE TYPE signal is asserted.

If the NO ERROR signal is asserted, the router circuit 91 (FIG. 5) enables the contents of the receive shift register to be transferred, in parallel, into the corresponding receive register 90B or 90C. This occurs after the router circuit 91 has performed a scan of the registers 90. If a RCV ACK receive acknowledgment signal has been received, the router circuit 91 enables the contents of register 98B and 98C to be coupled to respective outgoing link interfaces 102, in particular to transmit shift registers 111 therein. With reference to FIG. 6, the contents of the transmit shift register are serially coupled through a shift out terminal to an input terminal of multiplexer 110. If the CYCLE TYPE signal is negated, indicating a block transport cycle, the multiplexer 110 couples the signals from the transmit shift register 111 onto the transmit link to the connected processing element 42, and specifically the incoming link interface 101 of that processing element 42.

While the contents of shift register 111 are being shifted out, they are also being shifted in through the shift in input terminal. Thus, after the entire message block has been shifted out onto the transmit link in network 16, the block has also been retained in the transmit shift register 111. Thus, if an error or stall condition is detected, the message block is available in the outgoing link interface 102.

When the CYCLE TYPE signal is next asserted, the demultiplexer 103 couples the signal on the receive link onto a line 112 as the RCV ACK receive acknowledgement signal. This signal, if asserted, indicates that the message block has been properly received and that no stall condition exists. One RCV ACK signal is received by the router circuit 91 from each incoming link interface 101. The router circuit 91 does not allow the contents of the transmit shift register 111 of an outgoing link interface 102 to be overwritten until the asserted RCV ACK receive acknowledge signal is received from the receiving processing element 42 by the corresponding incoming link interface.

It will be appreciated that the network 16, including all of the network interfaces 53 are operated in synchronism, to ensure that the CYCLE TYPE signal is asserted and negated at appropriate times. The timing may be accomplished in response to the SYSTEM-CLOCK signal transmitted over system bus 13. Thus, while messages may be of variable length, defined by the start and end blocks 60 and 73 (FIGS. 7A and 7C), the message blocks are transmitted synchronously with the SYSTEM-CLOCK signal.

FIG. 9 depicts, in block diagram form, a routing table 96 which may be used in connection with the network interface depicted in FIG. 5. With reference to FIG. 9, the routing table includes a plurality of entries 120A through 120N (generally identified by reference numeral 120) each including a register 121 for storing a key, a register 122 for storing a priority and a register 123 for storing an identification of one or more registers 98 (FIG. 5). In one embodiment, all of the registers 121, 122 and 123 in all of the entries 120 are shift registers which are serially connected together and connected to the processor 50 resident in the processing element 42. The processor 50 initializes the registers by serially shifting appropriate values into the registers.

The routing table receives, over a bus 124, signals identifying a receive register 90 and a destination address. The identified register is the register 90 whose contents are currently being examined by the router circuit 91, that is, whose contents are being coupled by multiplexer 92 onto bus 94 (FIG. 5). The destination address corresponds to the address field then being transmitted over bus 94. Each entry in the routing table includes a match circuit 125 which compares the contents of its corresponding key register 121 with the signals on bus 124 and generates a MATCH signal in response to a positive comparison.

In one specific embodiment, the key registers 121 have a number of stages corresponding to the number of signal lines comprising bus 124, with two bits per stage. Each signal line in bus 124 is associated with one stage in the key registers 121. In determining whether there is a correspondence between the signals on bus 124 and the contents of the key register, each match circuits 125 compares the signal on each line of the bus 124 with both bits in the corresponding stage. If both bits in a stage are set (that is, if they have the logical value "1"), then the corresponding line in bus 124 must carry an asserted signal for there to be a match for that line. Similarly, if both bits in a stage are cleared (logical value "0"), the corresponding line in bus 124 must carry a negated signal for there to be a match for that line. If one bit is set and the other cleared, then the corresponding line in bus 124 may carry either an asserted signal or a negated signal for there to be a match for that stage. This implements a "don't care" arrangement, in which address bits may have either a binary value "1" or "0" and result in a positive match.

An asserted MATCH signal enables a driver 126 and one input of an AND gate 127 in the corresponding routing table entry. MATCH signals may be asserted in several of the entries, and priority values stored in the priority registers 122 are used to select one or more entries based on their relative priorities. The drivers 126 enabled by the asserted MATCH signals couple the contents of the priority registers 126 onto a priority bus 130. A priority comparator 131 in each entry compares the priority value stored in its associated priority register 122 with the priority values on the priority bus 130. If the entry's priority is the highest of all the priorities on the priority bus 130, the priority comparator 131 generates an asserted signal with enables the second input of the AND gate 127 in its routing table entry 120, thereby energizing the AND gate.

The energized AND gate 127 asserts a DRIVE signal which, in turn, enables a driver 132 in the routing table entry 120. The enabled driver 132 couples the contents of the entry's link register onto a bus 133, which carries the signals to the router circuit 91. The signals transmitted onto bus 133 identify one or more of the registers 98 (FIG. 5) which may receive the signals then on bus 94. As described above, these signals enable the router circuit 91 to establish a correspondence between the register 90 and the registers 98 for future blocks of a message.

As has been described above, the routing table 96 may be loaded by processor 50 when the system is first initialized. The contents of the various entries in the routing table 96, that is, the particular correspondences between the destination address and the transmit registers 98, depends upon the position of the processing element 42 in the network, the particular addressing scheme used and the particular network arrangement used.

For example, the network 16 may implement both a hypercube, or Boolean N-cube and a nearest neighbor mesh arrangement by provision of links between appropriate processing elements 42 and entries in the routing table 96. The routing table may also permit implementation of absolute addressing or relative addressing for transmission of messages. It will be appreciated that, if relative addressing is used for transmission of messages, the router circuit 91 will modify various bits of the destination address on bus 94 in a start block as it is moved to a transmit register 98, as is conventional in a relative addressing arrangement.

It will also be appreciated that the routing table 96 need not have an entry for every processing element 42 in the system; depending on the processing element address scheme that is used, the routing table entries, by means of the "don't care" arrangement described above, may only require a partial correspondence between the destination address in the message and certain bits in addresses contained in the routing table 96.

The "don't care" arrangement may also be used to provide addresses of variable length, and may also be used to selectively eliminate the requirement for the destination address field in messages. If the stages of the key registers 121 which would correspond to the address in the destination address field all have the "don't care" condition, then the routing of the messages is solely dependent upon the receive register 90 identification which is transmitted to the routing table 96. Furthermore, by providing that determination of receive registers 98 for certain addresses is based solely on leading destination address bits, and having don't care conditions for the other address bits, then message data can be transmitted in locations that would be used for those other address bits. Other addresses, not having the same leading address bits, may then require additional trailing address bits, thus implementing variable length addresses.

Figure 8:
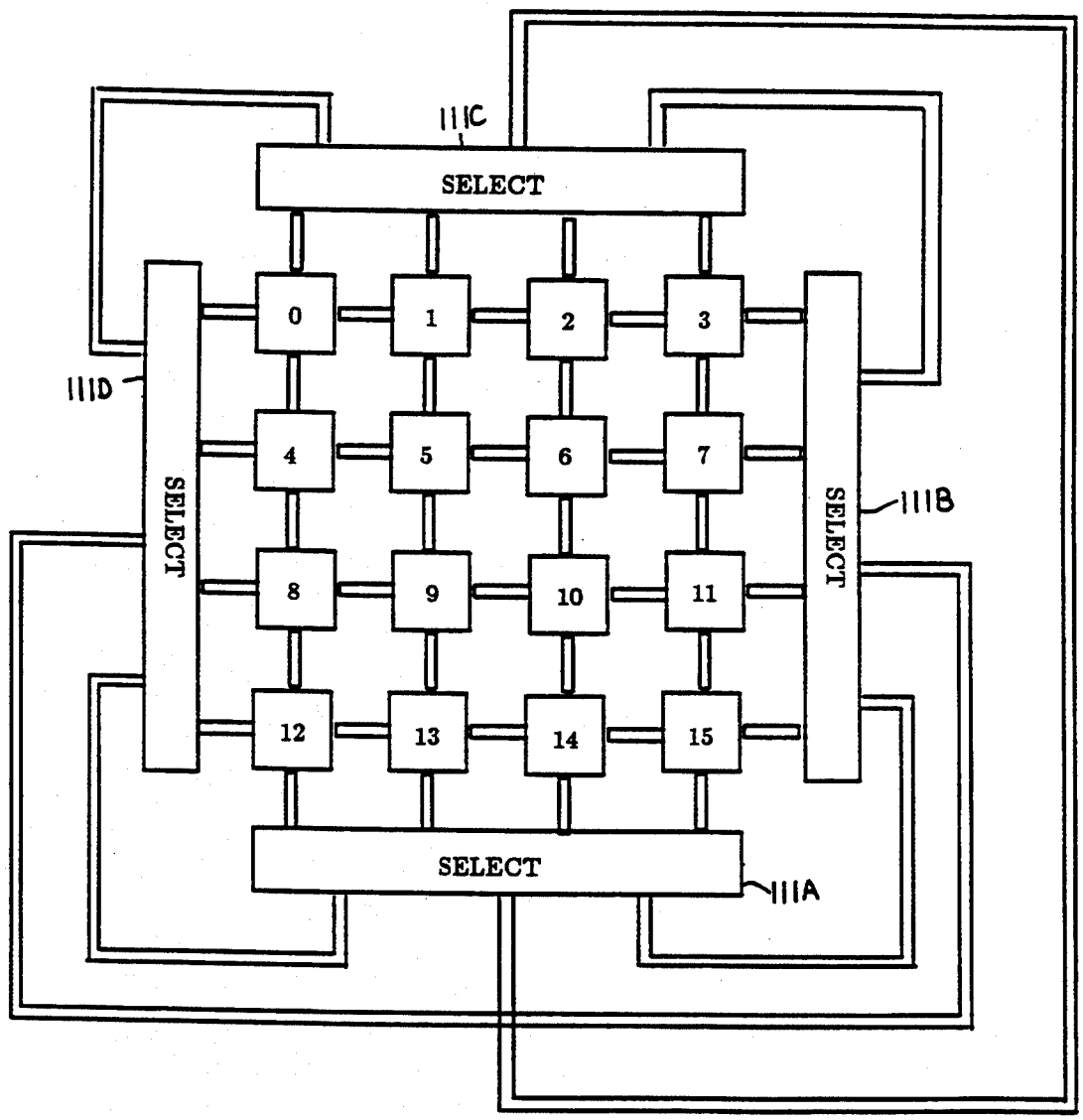
FIG. 8 depicts further details of the communications network used in the system depicted in FIG. 1.

As noted above, the topology of network 16 may be any conventional interconnection pattern or patterns, including, but not limited to, the hypercube pattern, the nearest neighbor mesh pattern, and the systolic pattern. Network 16 may be used to implement multiple patterns by providing network wires and corresponding incoming and outgoing link interfaces, transmit and receive registers and appropriate entries in the routing table 96. In addition, network 16 (FIG. 1) is organized, as depicted in FIG. 8, to allow transmission from one edge of the network to be coupled either to an opposite edge or to an adjacent edge. The transmission to an adjacent edge may be useful in connection with certain matrix operations.

FIG. 8 depicts schematically sixteen processing elements 42 (identified by indices "0" through "16") which are connected to transfer messages in a nearest neighbor mesh pattern. The nearest neighbor mesh pattern has four edges defined by the left most and right most columns and the upper most and lower most rows. Adjacent each edge is a multiplexer/demultiplexer generally identified by the reference numeral 111 controlled by CPU 10 which allows transmissions from the processing elements defining one edge to be transferred to processing elements defining another edge. That is, if in the nearest neighbor mesh pattern, the processing elements 42 are transmitting messages to the right, the processing elements 42 in the rightmost column transmit messages to multiplexer/demultiplexer 111B. Under control of CPU 10, multiplexer/demultiplexer 111B transmits the messages to one of the other multiplexer/demultiplexers 111, which is also enabled by CPU 10 to receive the messages and transmit them to the processing elements 42 defining its adjacent edge.

If the messages are being transmitted to the multiplexer/demultiplexer 111D adjacent the opposing edge, the processing elements continue to transmit messages only from left to right. However, if the messages are being transmitted to, for example, the multiplexer/demultiplexer 111A associated with the lower edge of the processing array, the processing elements 42 are enabled to transfer messages from the processing element to their left toward the right, and from the lower processing element in an upward direction. Thus, data in the processing elements organized in rows as depicted on FIG. 8 may, by means of appropriate messages be organized in columns. If the messages contain matrix data that is distributed among the processing elements 42, transposition of the matrix data may be easily accomplished.

The foregoing description has been limited to a specific embodiment of this invention. It will be apparent, however, that variations and modifications may be made to the invention, with the attainment of some or all of the advantages of the invention.

As one example, while in the system as described all communications between the CPU 10 and the processing elements 42 have been by way of system bus 13, it is apparent that the CPU 10, sequencer unit 15 and input/output units 12 may be connected into the network 16. In addition, while the system has been described in having a CPU 10 which controls the system, it is apparent that the system may be constructed having no master or supervising CPU 10, but instead the processing elements 42 may operate to control the system.

Also, a wide variety of currently available bus architectures may be readily adapted to the architectures of system bus 13 and group bus 41. For example, several of the address lines of current bus systems such as the VMEbus of Motorola Corporation can be used by using several of the address lines as part of the TAG (2:0) signals in the system bus 13 and group bus 41 described herein.

Therefore, it is the object of the appended claims to cover all such variations and modifications as come within the true spirit and scope of the invention.

What is claimed as new and desired to be secured by Letters Patent of the United States is:

1. A digital data processing system comprising:
   A. a host for generating host instructions, at least some of said host instructions including an address value;
   B. a plurality of processing elements each including:
      i. a host interconnection circuit connected to said host for receiving each host instruction from said host;
      ii. a memory including a plurality of addressable storage locations, each identified by an address, for storing information, including both processing element instructions and data;
      iii. offset value storage for storing a value;
      iv. a processing elements processor including:
         a. a processing circuit for performing processing operations in connection with data;
         b. a memory retrieval circuit connected to said processing circuit and said memory for retrieving processing element instructions and data from said memory, for directing data to said processing circuit for processing and for directing processed data from said processing circuit to said memory for storage;
         c. a memory address generating circuit connected to said offset value storage and said memory retrieval circuit for computing memory addresses for use by said memory retrieval circuit using the address value from said host instruction and the contents of said offset value storage; and
         d. a control circuit connected to said host interconnection circuit, said processing circuit, and said memory retrieval for enabling execution of host instructions received by said host interconnection circuit, said control circuit obtaining the host instruction from the host interconnection circuit, enabling said memory address generating circuit to generate an address in response to the address value contained in said host instruction, enabling said memory retrieval circuit to retrieve data from said memory and enabling said processing circuit to perform a processing operation on said retrieved data in response to the instruction.

2. A system as defined in claim 1 wherein said control circuit further enables said processing circuit to establish the contents of said offset value storage in response to the receipt by said host interconnected circuit of a predetermined host instruction.

3. A system as defined in claim 1 wherein said host instructions are divided into a guarded instruction class and an unguarded instruction class, each processing element including an enabled indicator connected to said control circuit and having a plurality of conditions, said control circuit establishing the condition of said enabled indicator in response to a host instruction, said control circuit being disabled from executing host instructions in the guarded class while said enabled indicator is in a predetermined one of said conditions.

4. A digital data processing system comprising:
   A. a host for generating host instructions, at least some of said host instructions including an address value;
   B. a plurality of processing elements each including:
      i. a host interconnection circuit connected to said host for receiving each host instruction from said host;
      ii. a memory including a plurality of addressable storage locations, each identified by an address, for storing information, including both processing element instructions and data;
      iii. offset value storage for storing a value;
      iv. a processing element processor including:
         a. a processing circuit for performing processing operations in connection with data;
         b. a memory retrieval circuit connected to said processing circuit and said memory for retrieving processing element instructions and data from said memory, for directing data to said processing circuit for processing and for directing processed data from said processing circuit to said memory for storage;
         c. a memory address generating circuit connected to said offset value storage and said memory retrieval circuit for computing memory addresses for use by said memory retrieval circuit using the address value from said host instruction and the contents of said offset value storage; and
         d. a control circuit connected to said host interconnection circuit, said processing circuit, and said memory retrieval circuit for enabling execution of host instructions received by said host interconnected circuit, said control circuit being responsive to a predetermined host instruction for enabling said processing circuit to establish the contents of said offset value storage.

5. A system as defined in claim 4 wherein said host instructions are organized into a first category and a second category, each processing element including an enabled indicator connected to said control circuit and having a plurality of conditions, said control circuit establishing the condition of said enabled indicator in response to receipt by said host interconnection circuit of a predetermined host instruction, said control circuit disabling execution of host instructions in one of said categories while said enabled indicator is in a predetermined one of said conditions.

6. A digital data processing system comprising:
   A. a host for generating host instructions, said host instructions being organized into a first category and a second category, at least some of said host instructions including an address value;
   B. a plurality of processing elements each including:
      i. a host interconnection circuit connected to said host for receiving each host instruction from said host;
      ii. a memory including a plurality of addressable storage locations, each identified by an address, for storing data;

iii. offset value storage for storing a value;
iv. a processing element processor including:
   a. a processing circuit for processing data;
   b. a memory retrieval circuit connected to said processing circuit and said memory for retrieving data from said memory, for directing data to said processing circuit for processing and for directing processed data from said processing circuit to said memory for storage;
   c. a memory address generating circuit connected to said offset value storage and said memory retrieval circuit for computing memory addresses for use by said memory retrieval circuit using the address value from said host instruction and the contents of said offset value storage;
   d. an enabled indicator having a plurality of conditions; and
   e. a control circuit connected to said host interconnection circuit, said processing circuit, and said memory retrieval circuit for enabling execution of host instructions received by said host interconnection circuit to:
      (I) establish the condition of said enabled indicator in response to a predetermined host instruction;
      (II) enable said processing circuit to establish the contents of said offset value storage in response to another predetermined host instruction; and
      (III) enable said memory address generating circuit to generate an address in response to the address value contained in said host instruction, enable said memory retrieval circuit to retrieve data from said memory and enable said processing circuit to process said retrieved data in response to the receipt of other host instructions and further in response to the condition of said enabled indicator and the respective categories of said other host instructions.

7. A method of time-multiplexing the operations of a plurality of real processors to simulate the operations of a greater number of virtual processors, each said real processor having a computational element and an associated memory to be used by said computational element, comprising allocating the memory of each real processor into a plurality of segments, each segment associated with and used by one of the virtual processors simulated by said real processor, associating each real processor with offset value storage, the contents of said storage being used to relocate memory addresses generated by said real processor to or within the segment of memory associated with a virtual processor simulated by said real processor, transmitting an instruction indicating an operation to be performed by a virtual processor at an indicated memory address to the real processor simulating said virtual processor, executing said instruction at said real processor by relocating memory addresses using the contents of said offset value storage, transmitting a special instruction to a given real processor which is simulating a first virtual processor, said special instruction directing modification of the contents of the offset value storage associated with said real processor, and executing said special instruction at said given real processor by modifying the contents of its associated offset value storage, whereby said real processor may begin simulation of a second virtual processor.

* * * * *

UNITED STATES PATENT AND TRADEMARK OFFICE
CERTIFICATE OF CORRECTION

PATENT NO.    : 5,418,970

DATED         : May 23, 1995

INVENTOR(S)   : David K. Gifford

It is certified that error appears in the above-identified patent and that said Letters Patent is hereby corrected as shown below:

Col. 2, line 60, after "SISD", insert --,--.

Col. 23, line 25, replace "TRACK" with --TR ACK--.

Col. 23, line 29, replace "TRACK" with --TR ACK--.

Signed and Sealed this

Twenty-first Day of May, 1996

Attest:

BRUCE LEHMAN

*Attesting Officer*    *Commissioner of Patents and Trademarks*